US012622474B2

(12) United States Patent
Bhattacharyya et al.

(10) Patent No.: US 12,622,474 B2
(45) Date of Patent: May 12, 2026

(54) ANTIVIRAL MASK AND ANTIVIRAL FILTER MADE FROM A BREATHABLE MICROPOROUS POLYMERIC MEMBRANE

(71) Applicant: University of Kentucky Research Foundation, Lexington, KY (US)

(72) Inventors: Dibakar Bhattacharyya, Lexington, KY (US); J. Todd Hastings, Lexington, KY (US); Thomas D. Dziubla, Lexington, KY (US); Yinan Wei, Lexington, KY (US); Rollie Mills, Lexington, KY (US); R.J. Vogler, Lexington, KY (US); Matthew Bernard, Lexington, KY (US); Jacob Concolino, Lexington, KY (US); Kevin C. Baldridge, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 777 days.

(21) Appl. No.: 18/008,085

(22) PCT Filed: Jun. 2, 2021

(86) PCT No.: PCT/US2021/035470
§ 371 (c)(1),
(2) Date: Dec. 2, 2022

(87) PCT Pub. No.: WO2021/247720
PCT Pub. Date: Dec. 9, 2021

(65) Prior Publication Data
US 2023/0225433 A1 Jul. 20, 2023

Related U.S. Application Data

(60) Provisional application No. 63/033,277, filed on Jun. 2, 2020, provisional application No. 63/034,057, filed on Jun. 3, 2020.

(51) Int. Cl.
| | | |
|---|---|---|
| *A41D 13/11* | (2006.01) | |
| *A41D 31/30* | (2019.01) | |
| *B32B 27/16* | (2006.01) | |

(52) U.S. Cl.
CPC ........ *A41D 13/1192* (2013.01); *A41D 31/305* (2019.02); *B32B 27/16* (2013.01);
(Continued)

(58) Field of Classification Search
CPC ......... A62B 23/02; A62B 23/025; A62B 7/10; A62B 23/00; A41D 13/1192
See application file for complete search history.

(56) References Cited

U.S. PATENT DOCUMENTS

| | | |
|---|---|---|
| 2013/0052112 A1 | 2/2013 | Cozean |
| 2014/0300005 A1 | 10/2014 | Di Franco et al. |
(Continued)

FOREIGN PATENT DOCUMENTS

| | | | | |
|---|---|---|---|---|
| CN | 109222278 A | * | 1/2019 | .......... A61K 36/484 |
| JP | 5467678 B2 | | 6/2011 | |
(Continued)

OTHER PUBLICATIONS

Machine Translation of WO-2021005258-A2. Accessed from PE2E Search tool on Oct. 2025. (Year: 2021).*
Machine Translation of CN-109222278-A. Accessed from PE2E Search tool on Oct. 2025. (Year: 2019).*

*Primary Examiner* — Joseph D. Boecker
*Assistant Examiner* — Jaeick Jang
(74) *Attorney, Agent, or Firm* — Stites & Harbison PLLC; Warren D. Schickli

(57) ABSTRACT

An antiviral mask and antiviral filter include a thin breathable, microporous polymeric membrane. That membrane may include a plurality of pores functionalized with a proteolytic enzyme, an antibody or a combination thereof. The antiviral mask and antiviral filter may also include a
(Continued)

coating of graphene oxide, lignin sulfonate or a combination thereof and/or a fluorescent virus tagging agent.

12 Claims, 23 Drawing Sheets

(52) U.S. Cl.
CPC ..... *B32B 2255/20* (2013.01); *B32B 2305/026* (2013.01); *B32B 2307/724* (2013.01); *B32B 2307/7376* (2023.05); *B32B 2535/00* (2013.01); *B32B 2571/00* (2013.01)

(56) References Cited

U.S. PATENT DOCUMENTS

| | | | | |
|---|---|---|---|---|
| 2017/0253647 | A1 | 9/2017 | Martin et al. | |
| 2018/0290108 | A1 | 10/2018 | Fanchini et al. | |
| 2021/0346735 | A1* | 11/2021 | Coyle | A62B 18/08 |
| 2021/0346831 | A1* | 11/2021 | Stolyarov | B01D 46/0028 |
| 2022/0071325 | A1* | 3/2022 | Ward | D06M 13/3255 |
| 2023/0103369 | A1* | 4/2023 | Gluckman | B01J 20/268 |
| | | | | 435/5 |

FOREIGN PATENT DOCUMENTS

| | | | | |
|---|---|---|---|---|
| JP | 2011103924 | A | 4/2014 | |
| WO | WO-2021005258 | A2 * | 1/2021 | A41D 31/305 |
| WO | WO-2021199043 | A1 * | 10/2021 | B32B 5/267 |

* cited by examiner

PVDF

Polyester

ANTIVIRAL MASK AND ANTIVIRAL FILTER MADE FROM A BREATHABLE MICROPOROUS POLYMERIC MEMBRANE

RELATED APPLICATION

This application is a § 371 National State Application of PCT/US2021/035470 filed Jun. 2, 2021 which claims priority to U.S. Provisional Patent Application Ser. No. 63/033,277 filed on Jun. 2, 2020 and U.S. Provisional Patent Application Ser. No. 63/034,057 filed on Jun. 3, 2020, all of which are hereby incorporated by reference in their entirety.

GOVERNMENT INTEREST

This invention was made with government support under RAPID grant number 2030217 awarded by the National Science Foundation, and Superfund Research Program Grant P42ES007380 awarded by the National Institute of Environmental Health Sciences. The government has certain rights in the invention.

TECHNICAL FIELD

This document relates generally to antiviral masks and antiviral filters made from a thin, breathable, microporous polymeric materials.

BACKGROUND

The spread of coronaviruses, such as SARS-CoV-2, through human contact and aerosol exhalation/inhalation could be significantly reduced by advancing membrane filter-based simple enzymatic deactivation techniques. Respiratory coronaviruses are being extensively studied in the research community, due to the high seasonal fatalities globally caused by the common influenza, but the danger of new emergent coronaviruses has become apparent with the current wide-spread nature of the severe acute respiratory syndrome coronavirus 2 (SARS-CoV-2). This virus, which started a global pandemic in the early half of 2020, has caused more than 2.2 million total Coronavirus Disease 2019 (COVID-19) deaths and infected more than 100 million humans.

With the large-scale infection of this virus, the use of respiratory face masks (N95, surgical, home-made) has become vital to prevent the continuation of the pandemic, as it has been proven to prevent both the infection of the individual and the virus transmittance from the host via the capture of respiratory droplets. Unfortunately, in non-health care and health care workers, the use of respiratory face masks reduced the rate of infection by a respiratory virus by only about 50% and 80%, respectively, thus showing the immense need for novel technological improvements in the field of mask research and development. The development of smart filtration materials with lower air flow resistance to remove airborne nanoparticles and virus particles will provide immense human health and industrial work-place benefits.

SUMMARY

In accordance with the purposes and benefits set forth herein, a new and improved antiviral mask is provided. That antiviral mask or filter comprises a body including a breathable, microporous polymeric membrane and a securing strap connected to the body and adapted to secure the antiviral mask in place over the nose and mouth of a user or wearer.

The polymeric membrane may have a thickness of between about 30 microns and about 500 microns, a porosity of between about 20% and about 80% and an average pore size of between about 15 nm and about 300 nm. The polymeric membrane may also have a pressure drop of less than about 5 psi or 34.47 kPa.

The polymeric membrane may be made from a material selected from a group consisting of polyvinylidene difluoride, polysulfone, polypropylene, cellulose, poly (methacrylic acid) functionalized polyvinylidene difluoride, poly (methacrylic acid) functionalized polysulfone, poly (methacrylic acid) functionalized polypropylene (PP), poly (methacrylic acid) functionalized cellulose and combinations thereof.

In one or more of the many possible embodiments of the antiviral mask, the polymeric membrane includes a plurality of pores functionalized with a proteolytic enzyme, a virus denaturing agent and combinations thereof. The proteolytic enzyme may be selected from a group consisting of subtilisin, trypsin, papain, proteinase K, chymotrypsin, elastase and combinations thereof. The virus denaturing agent may be selected from a group consisting of an antibody, a chemical agent that reduces a disulfide bond to an —SH group, dithiothreitol, tris (2-carboxyethyl) phosphine (TLEP), a RBD (receptor-binding domain)/ACE2 interaction inhibitor, heparin, glycyrrhizic acid and combinations thereof.

In one or more of the many possible embodiments of the antiviral mask, the antiviral mask further includes a coating of graphene oxide, lignin sulfonate or combinations thereof on the polymeric membrane. In one or more of the many possible embodiments of the antiviral mask, the antiviral mask includes an antiviral agent in the coating. The antiviral agent may be selected from a group consisting of a quaternary amine, an essential oil derivative having antiviral properties, copper nanoparticles, gold nanoparticles and combinations thereof.

In one or more of the many possible embodiments of the antiviral mask, the antiviral mask includes a fluorescent virus tagging agent of a type known in the art.

In one or more of the many possible embodiments of the antiviral mask, the antiviral mask includes an air permeable outer layer covering the polymeric membrane. In one or more of the many possible embodiments of the antiviral mask, the antiviral mask includes an air permeable, inner support layer whereby the polymeric membrane is sandwiched between the air permeable outer layer and the air permeable inner support layer. In still other embodiments, the antiviral mask includes the polymeric membrane and the air permeable inner support layer without the air permeable outer layer.

In accordance with yet another aspect, a new and improved antiviral air filter is provided. Such an air filter may be used to establish a virus-protected, enclosed environment system. That antiviral air filter comprises a low pressure drop (i.e. less than about 5 psi or 34.47 kPa), microporous polymeric membrane wherein the polymeric membrane has a thickness of between about 30 microns and about 500 microns, a porosity of between about 20% and about 80% and an average pore size of between about 15 nm and about 300 nm.

The polymeric membrane may be made from a material selected from a group consisting of polyvinylidene difluoride, polysulfone, polypropylene, cellulose, poly (methacrylic acid) functionalized polyvinylidene difluoride, poly (methacrylic acid) functionalized polysulfone, poly (methacrylic acid) functionalized polypropylene (PP) (poly/methacrylic acid) functionalized cellulose and combinations thereof. In one or more of the many possible embodiments of the antiviral; filter, the polymeric membrane includes a plurality of pores functionalized with a proteolytic enzyme, a virus denaturing agent and combinations thereof as noted elsewhere in this document.

In one or more of the many possible embodiments of the antiviral filter, the antiviral filter includes a coating of graphene oxide, lignin sulfonate or combinations thereof on the polymeric membrane. In one or more of the many possible embodiments of the antiviral filter, the antiviral filter includes a fluorescent virus tagging agent. The antiviral filter may be used for air filtration in an enclosed air filtration system.

In the following description, there are shown and described several preferred embodiments of the antiviral mask and antiviral filter. As it should be realized, the mask and filter are capable of other, different embodiments and their several details are capable of modification in various, obvious aspects all without departing from the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the antiviral masks and antiviral filters and together with the description serve to explain certain principles thereof.

FIG. 3 is an SEM cross-section image of PVDF400 commercial membrane, composed of a PVDF layer and a polyester support layer.

FIG. 5 illustrates the experimental relationship between dry-air permeability and (A) the inverse of membrane thickness (via PVDF400 stacking to increase thickness) and (B) pore radius squared (via Durapore membranes with varying pore size) for water filtration membranes. Data were collected via dry air filtration using in-line flow cell with an area of 9.23 cm². Measured flow rate measurements normalized at STP.

Figure 6:
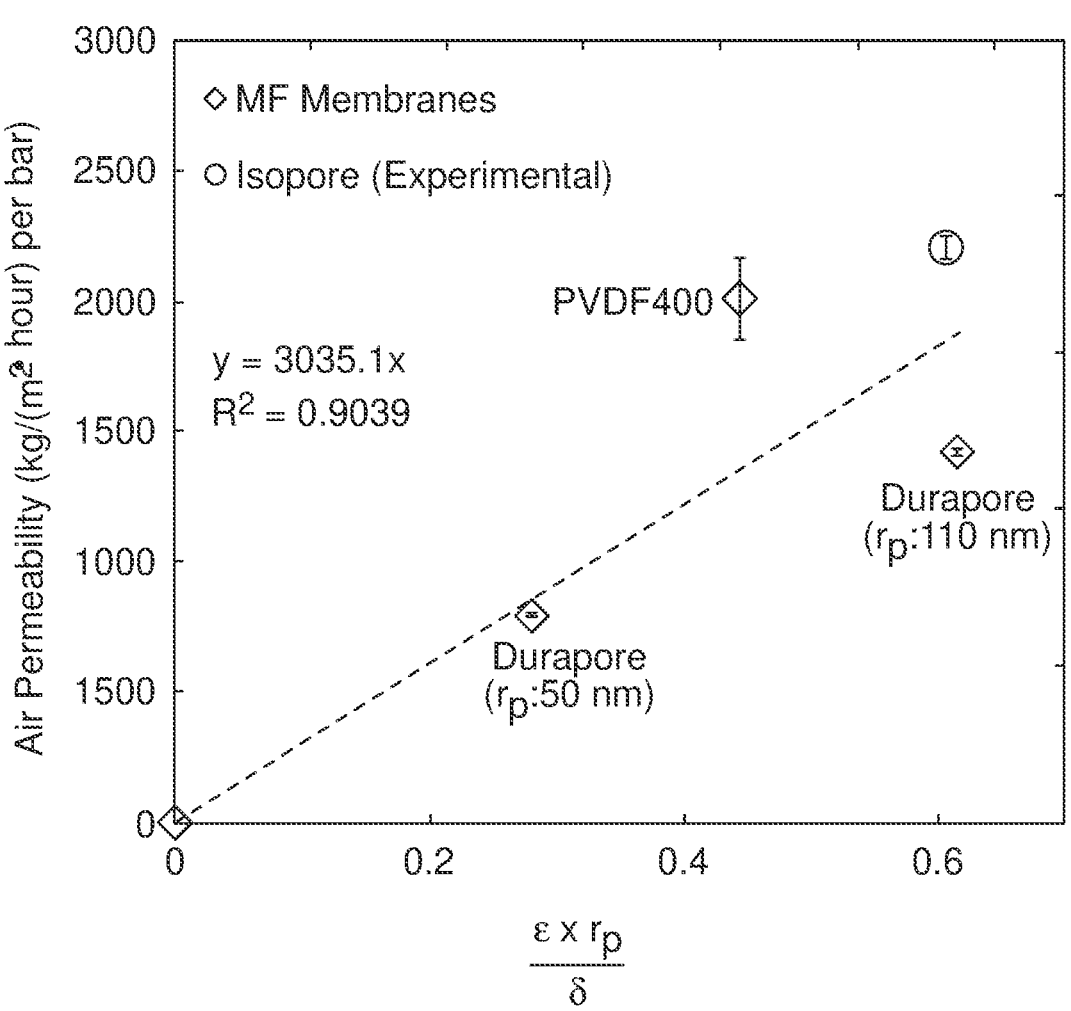

FIG. 6 is an experimentally-determined linear relationship between air permeability and membrane property variable factor. PVDF400 (only PVDF layer), Durapore (diameter: 100 nm) and Durapore (diameter: 220 nm) were used to determine the linear relationship. Based on linear relationship and membrane variable factor, Isopore membrane air permeability was calculated and compared to experimental. All experiments were conducted using ultra-pure grade dry air. Measured flow rate measurements normalized at STP. X axis is overall membrane property parameter.

Figures 7A, 7B:
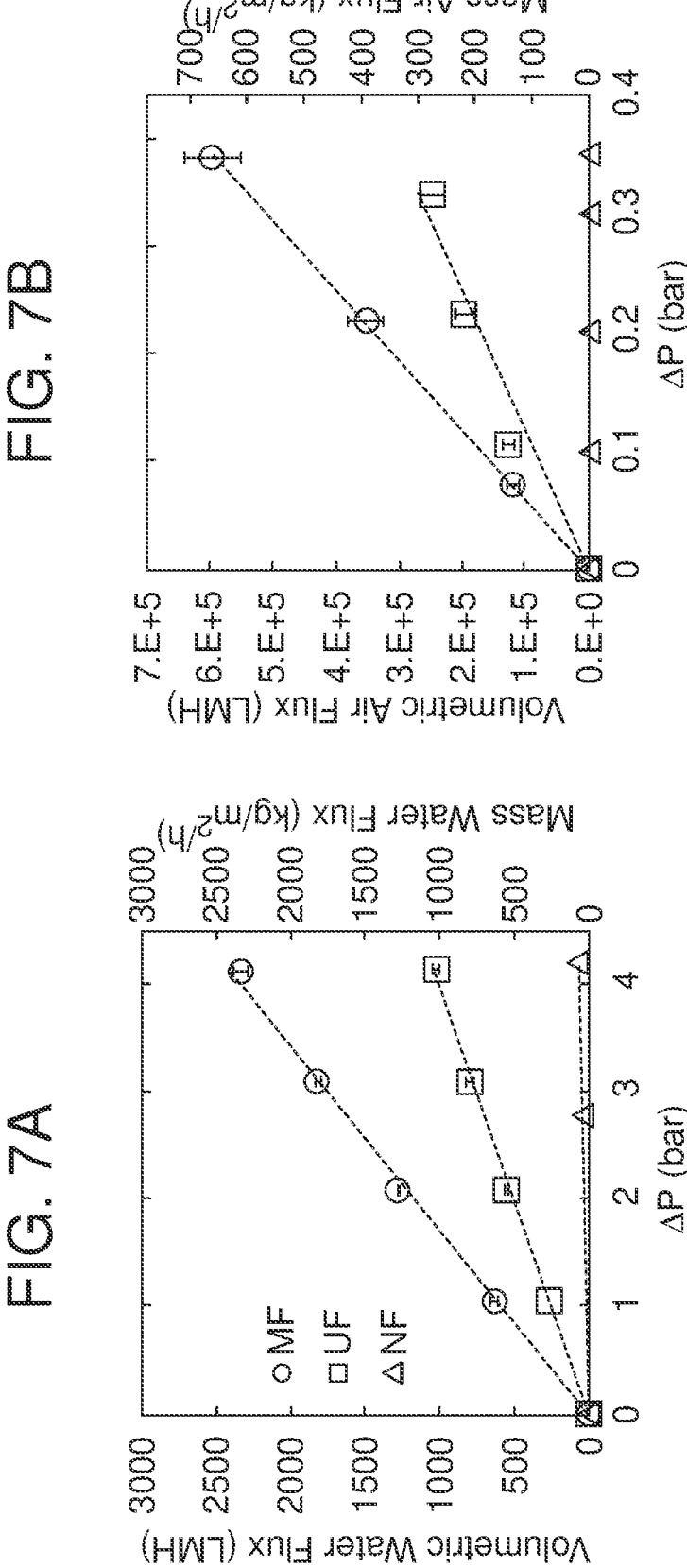

FIG. 7 is (A) Water and (B) dry-air (0% RH) flux results for PVDF400 (MF), PS35 (UF), and NF270 (NF) membranes as a function of pressure. Water flux results were obtained using a dead-end cell with a membrane of 13.2 cm². Air flux data were collected using in-line flow cell with an area of 9.23 cm². Error bars represent standard deviations of triplicate data. Both horizontal axis (left and right) apply for all data displayed. Flow rate measurements normalized at STP.

Figure 8:
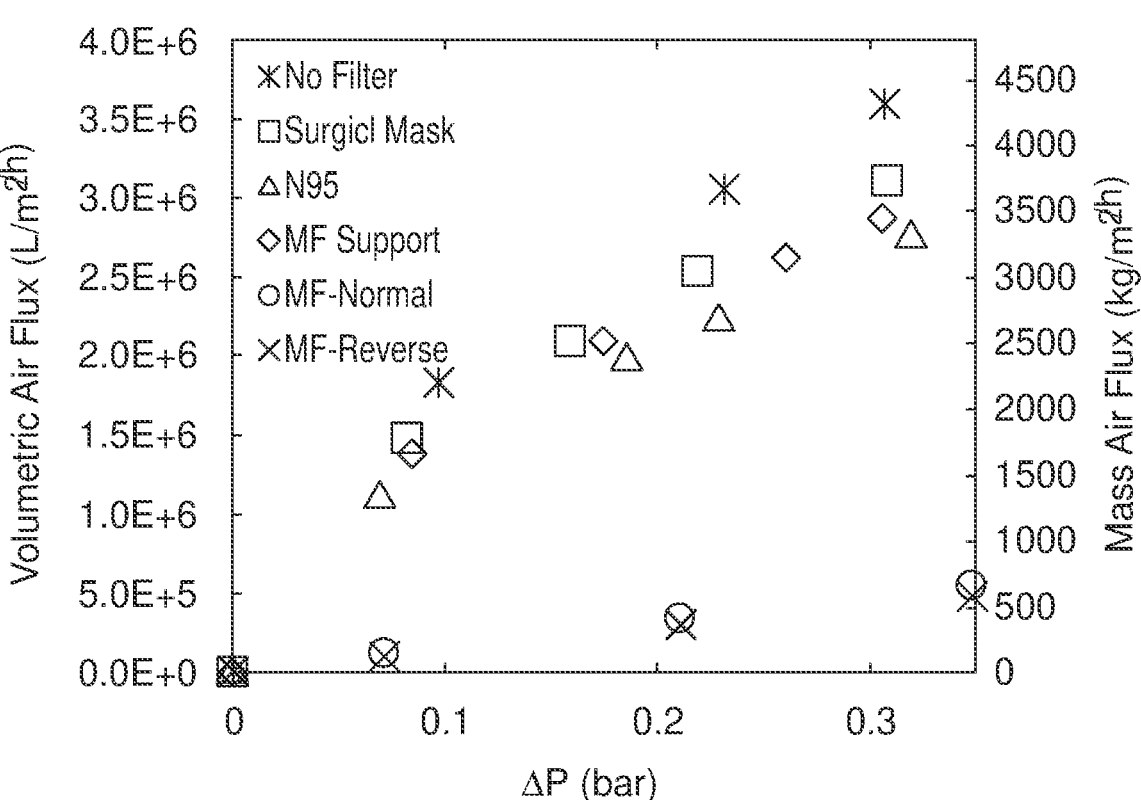

FIG. 8 is the dependence of dry-air flowrate and feed-pressure for surgical and N95 masks, a membrane support (polyester backing), and a PMAA-functionalized PVDF membrane. The PVDF PMAA membrane was tested in two orientations: with the surface facing the feed side (PVDF-PMAA) and the surface facing the permeate side (PVDF-PMAA Reverse). Data were collected using in-line flow cell with an area of 9.23 cm². Flow-rate data were also collected without a membrane in the flow cell as a control. Flow rate measurements normalized at STP.

Figure 9:
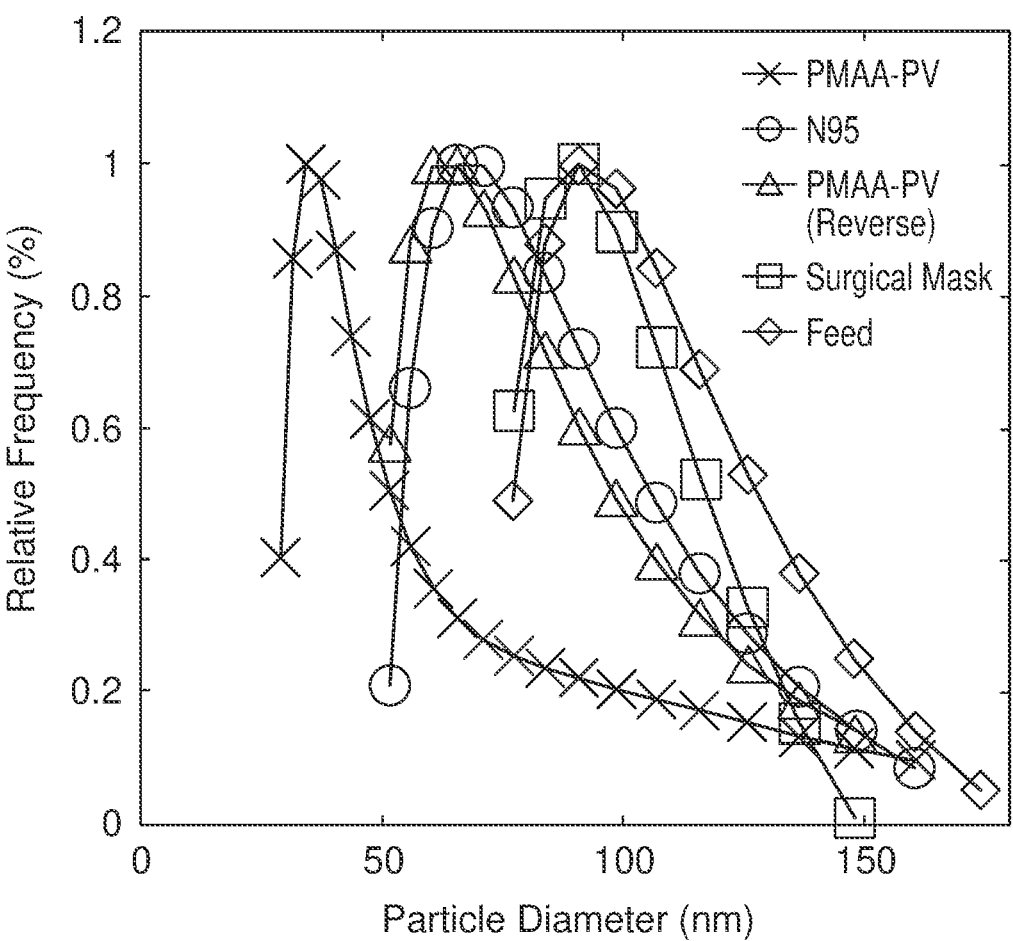

FIG. 9 is a PSL particle size distribution at 22.7° C. at an atomizer inlet pressure of 0.7 bar and a relative humidity of 68%. Particle size quantified using DLS (volume-weighted measurements).

FIG. 10 is (A) PSL-COOH and PSL-GFP particle count per liter of feed and permeate air for a PVDF400 membrane after ~50 min of filtration and (B) Volumetric air flux drop through PVDF400 membrane (caused by PSL-COOH and PSL-GFP capture/fouling) with respect to time of filtration at a relative humidity of 16-22%. Feed air concentration of particles are same as FIG. 10-A. Particle count measured using Met One Instruments' GT-526S particle counter. Flow rate measurements normalized at STP.

Figures 11A, 11B, 11C:
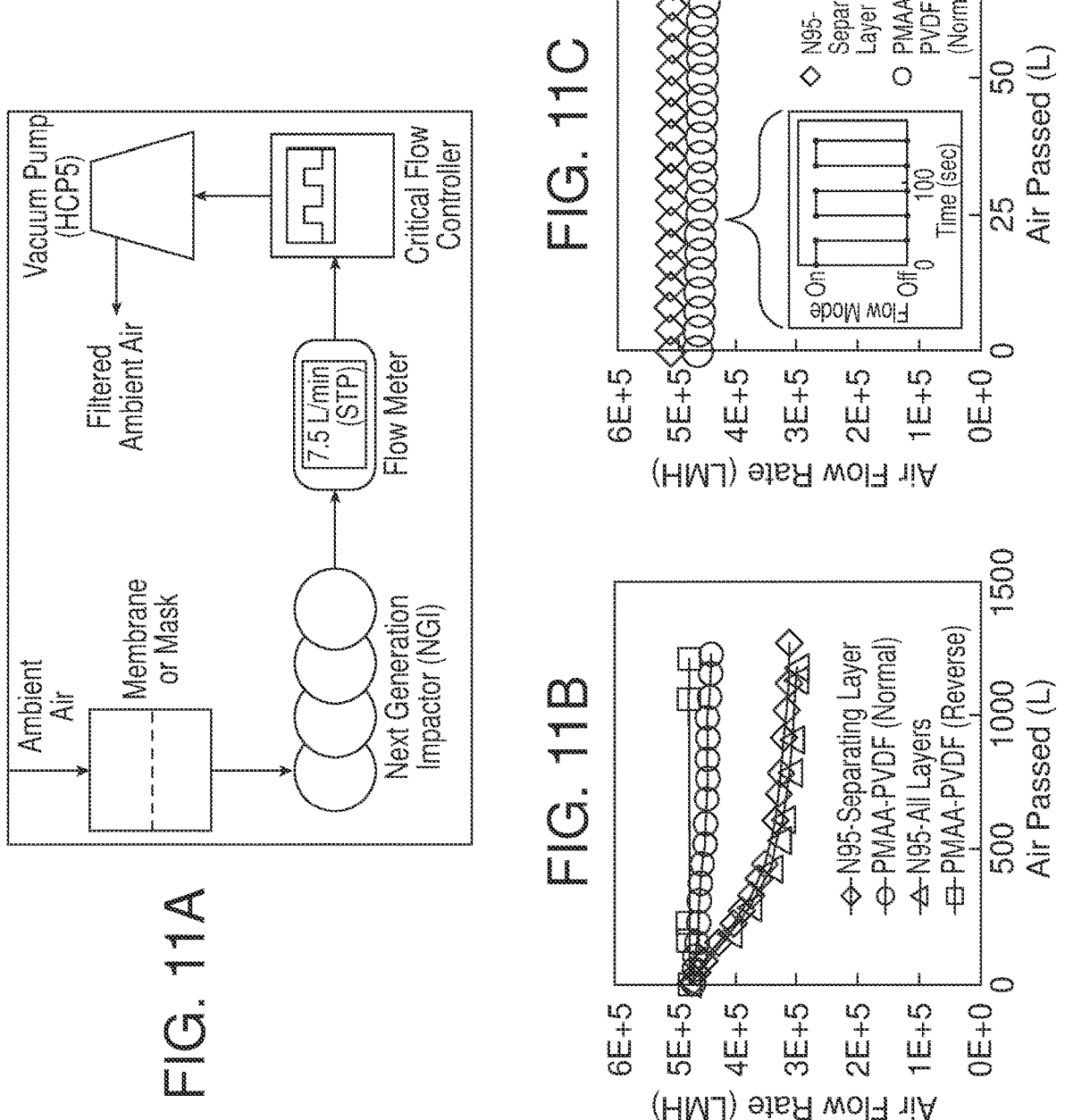

FIG. 11 is (A) Schematic of ambient air filtration testing of membrane and mask material. Ambient air flux through PMAA-PVDF membrane (normal and reverse orientation), N95 commercial mask (forward orientation), and N95 separating layer under a consistent pressure with (B) continuous flow mode and (C) sinusoidal flow mode (30 seconds with flow on, 30 seconds with flow off). Beginning air flux was set at 7.50±0.50 LMH (average breathing flux). Flow rate measurements normalized at STP.

Figures 12A, 12B, 12C:
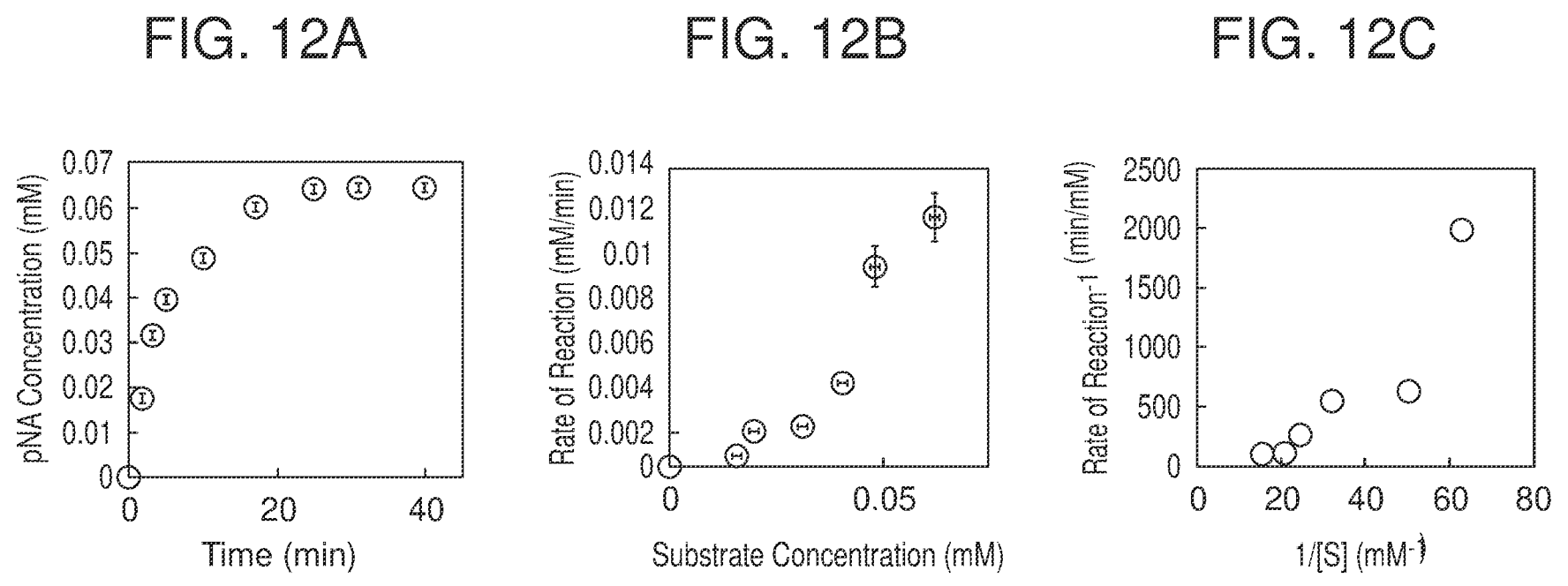

FIG. 12 is (A) Product concentration vs. time (B) Michaelis-Menten plot (C) Lineweaver-Burk plot for polypeptide (N-succinyl-Ala-Ala-Pro-Phe-p-nitroanilide) proteolysis by Subtilisin A enzyme. Initial substrate concentration was ~0.8 mM with an enzyme concentration of 0.12 mg/L. Reaction was conducted at 37° C. and a consistent pH of 7.8. pH was maintained by using a 50 mM Phosphate buffer. $K_M$ and $V_{max}$ were calculated to be 0.186 mM and 0.0362 mM/min, respectively.

Figure 13:
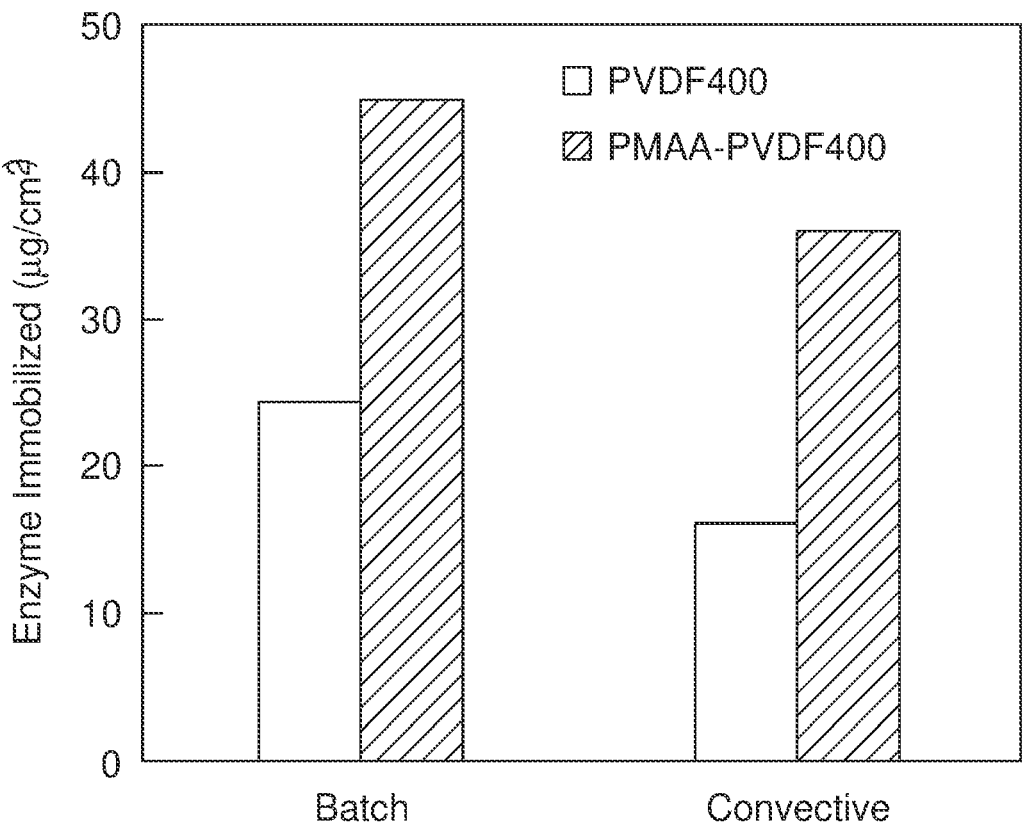

FIG. 13 is a subtilisin A functionalization of PMAA-PVDF and unfunctionalized PVDF400 membranes with batch and convective mode. Membrane area was 9.32 cm² and 100 mL of 0.1 mg/mL enzyme solution was used for immobilization process.

Figure 14:
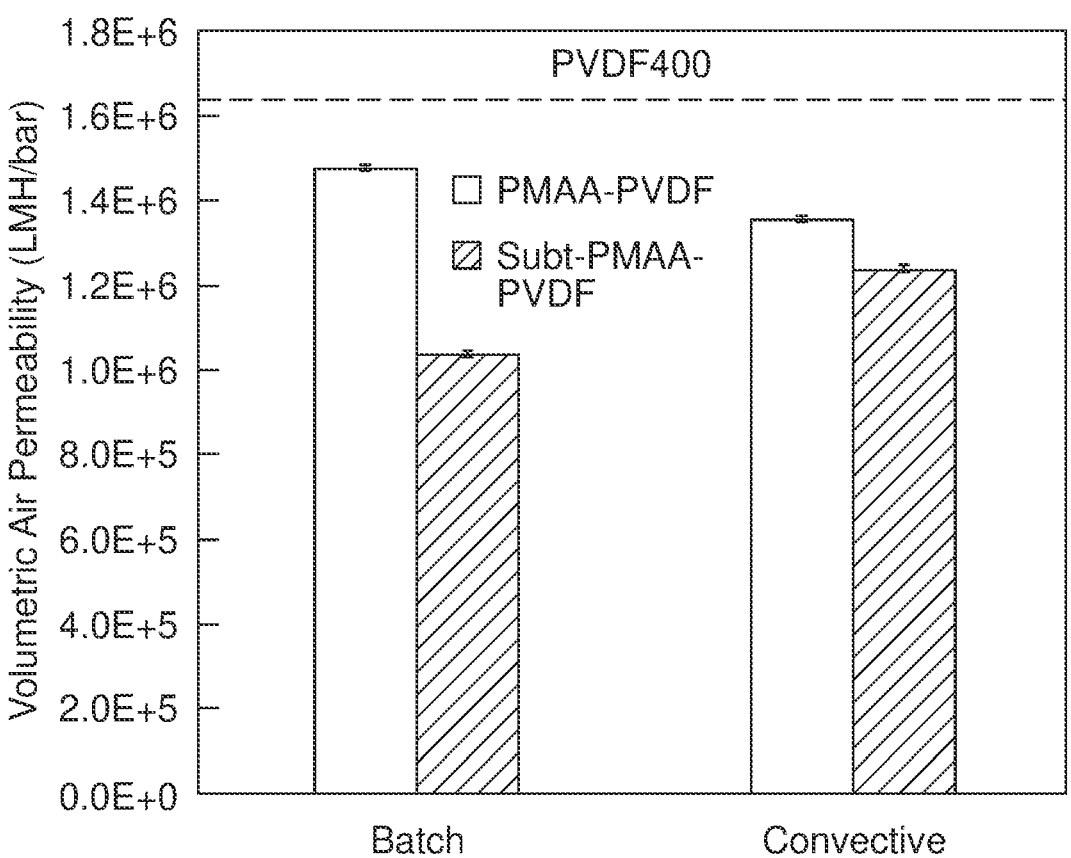

FIG. 14 is an air permeability decrease of PVDF400 membrane after PMAA (1.5-3%) and Subtilisin functionalization with batch and convective immobilization method. Flow rate measurements normalized at STP.

Figure 15:
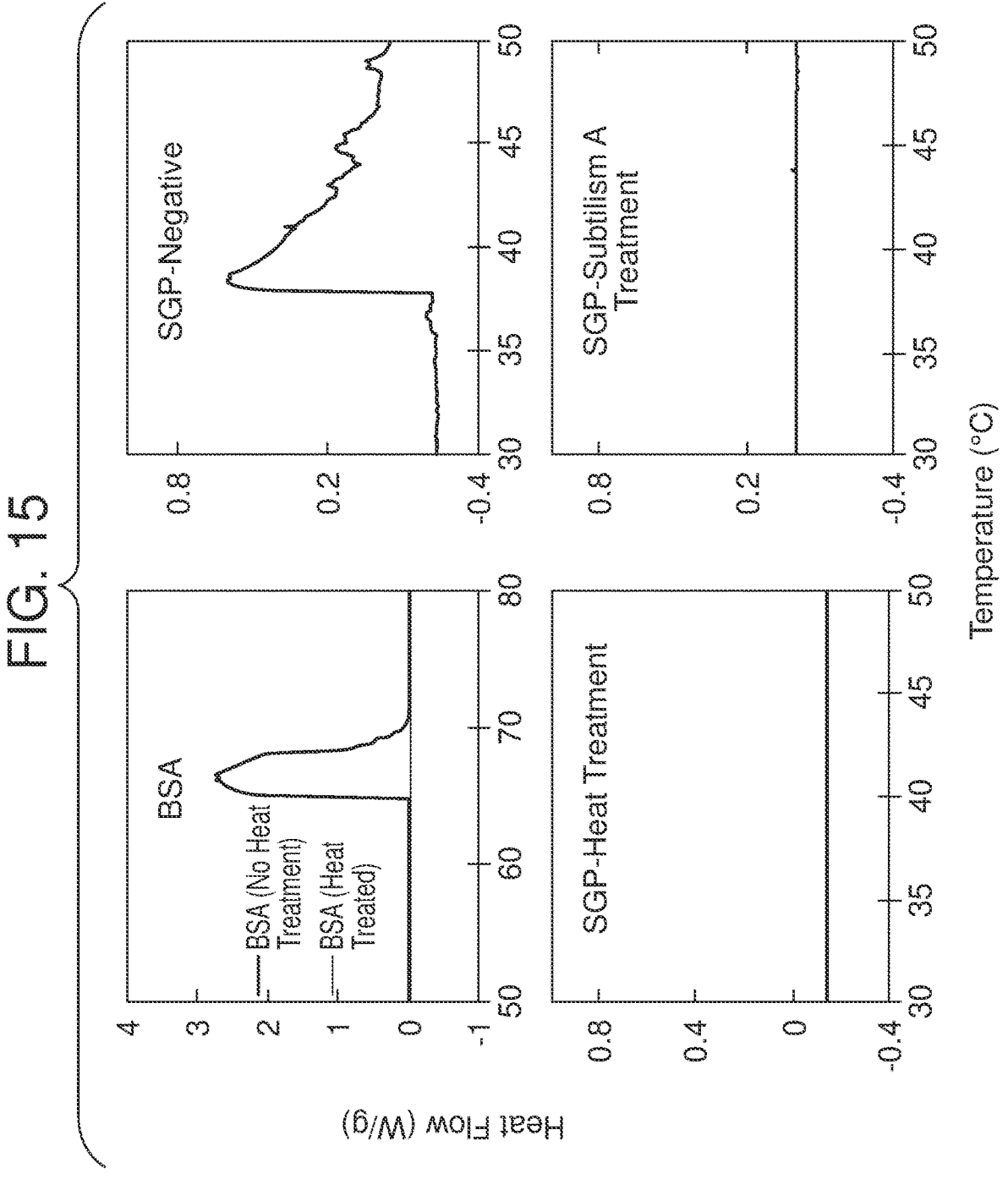

FIG. 15 is a DSC thermograph of SGP solutions (1.5-2 mg/mL) with no treatment, heat treatment (70° C. for 60 minutes), and Subtilisin treatment (1 mg/mL) at a heating rate of 0.5° C./min. BSA (10% solution) native and heat treatment available as reference/standard.

Figure 16:
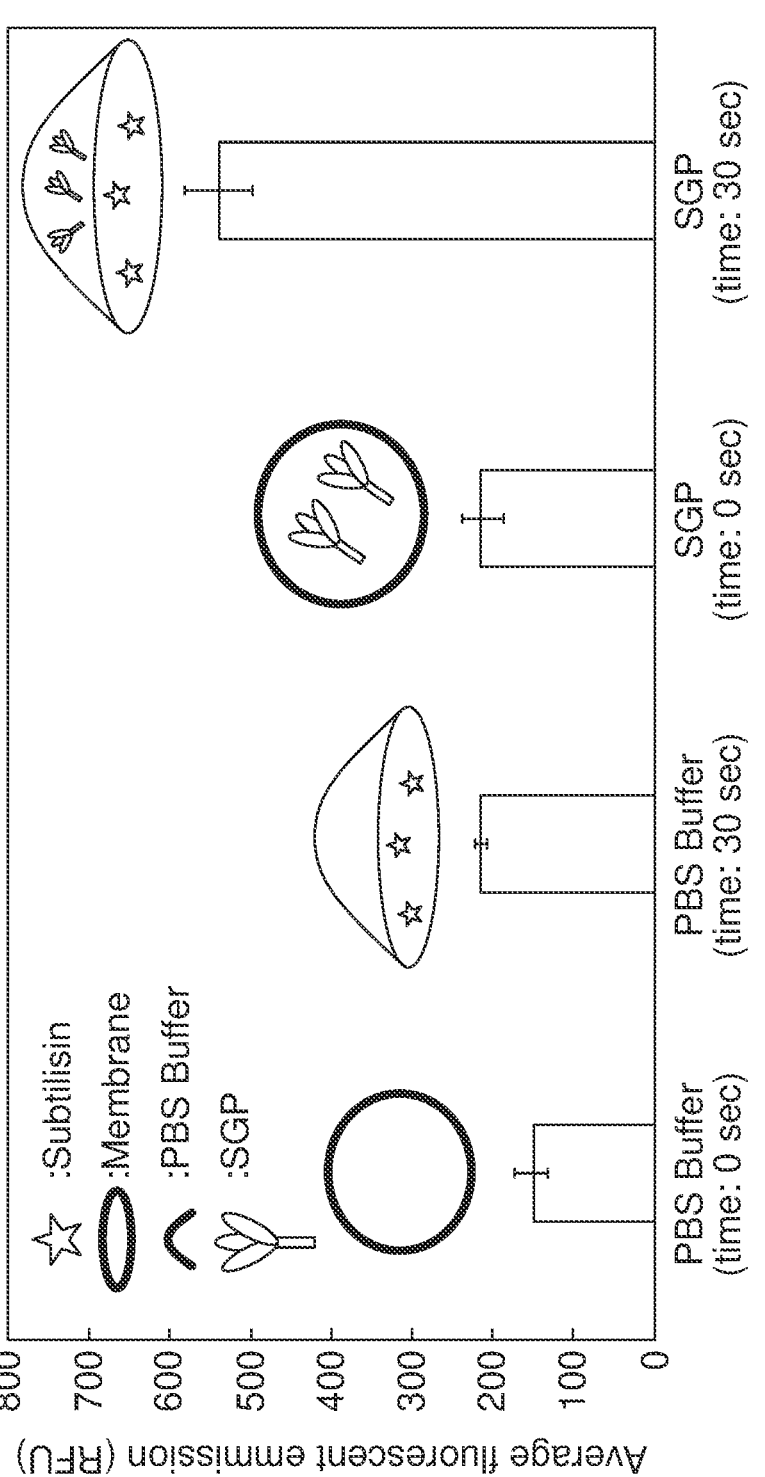

FIG. 16 is an average fluorescent emission (RFU) of SGP before and after 30 second exposure to Subtilisin-functionalized PMAA-PVDF membrane in the presence of hydrophobic-binding fluorescent dye, Sypro Orange. Analyzed using Synergy H1 Hydrid Reader. Minimum hydration of membrane with 1.35 µl of solution per mm² of membrane surface during denaturation process.

Figure 17:
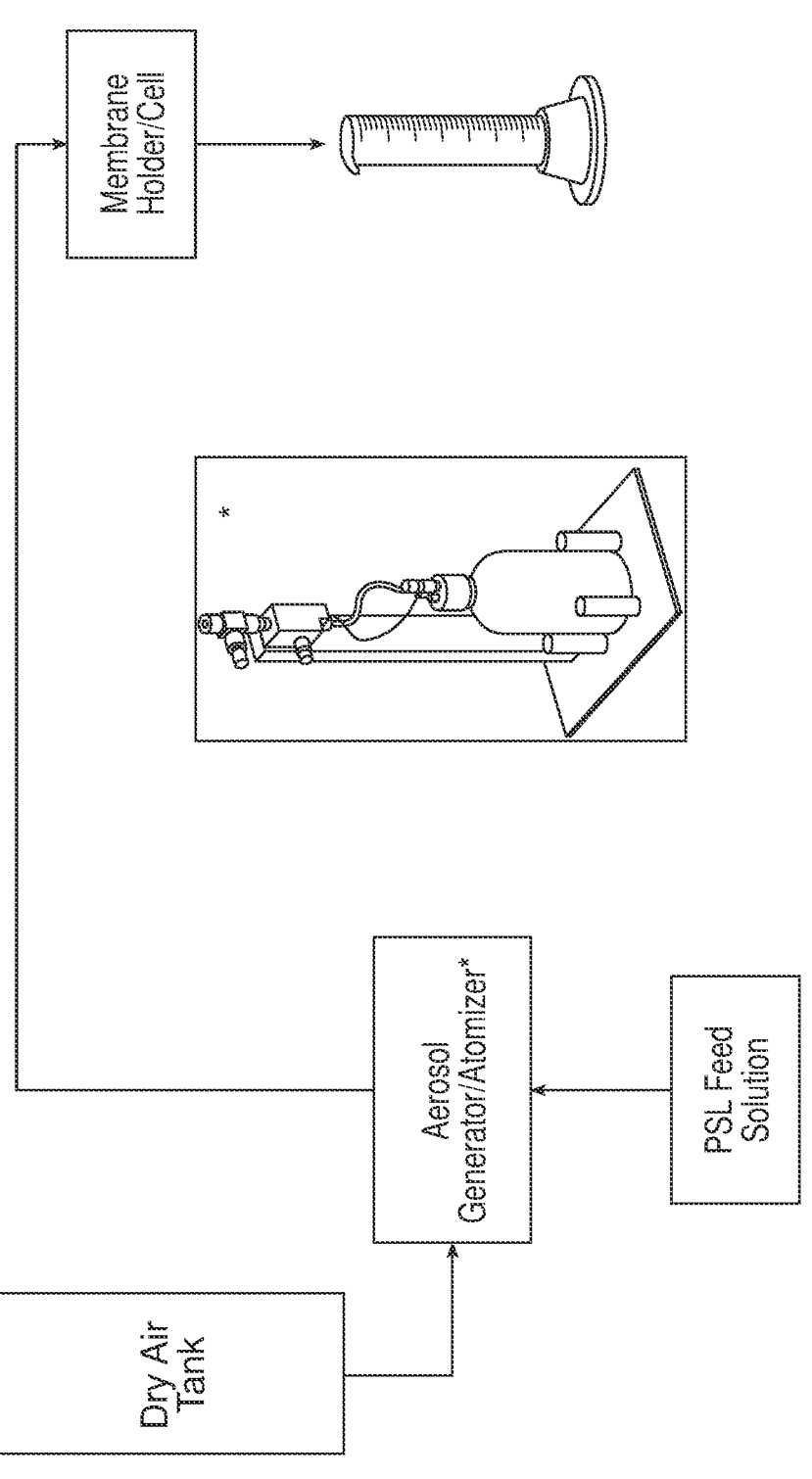

FIG. 17 is a schematic of aerosol generation and filter testing module utilized in testing aerosolized particle filtration through membrane filters. Schematic of Aerosol Generator (TSI, Model 3076) provided from TSI manual.

Figure 18:
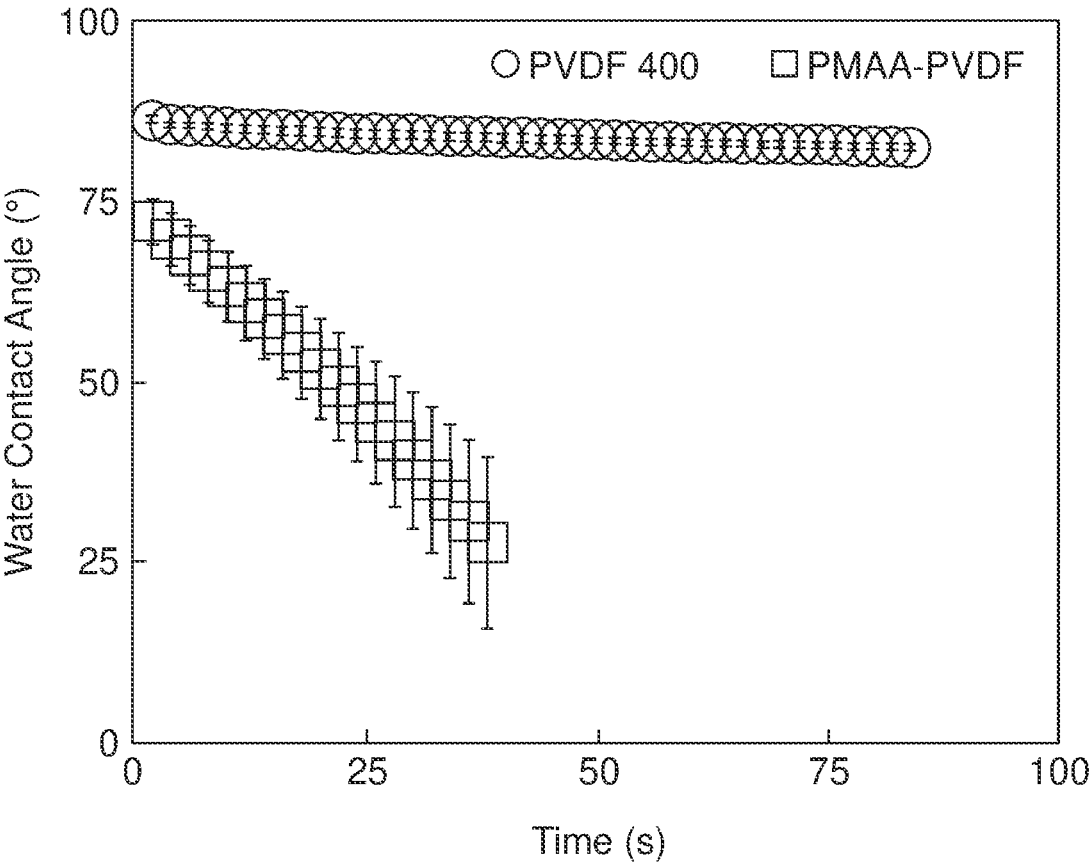

FIG. 18 is the water contact angle of PVDF 400 and PMAA-PVDF membranes as a function of time. The sessile-drop method was used to measure contact angle and the water pH was ~6. The PMAA-PVDF membranes had weight gain of 3.3% with PMAA functionalization. Error bars represent the standard deviation of 3 measurements taken at different locations on the samples.

Figure 19:
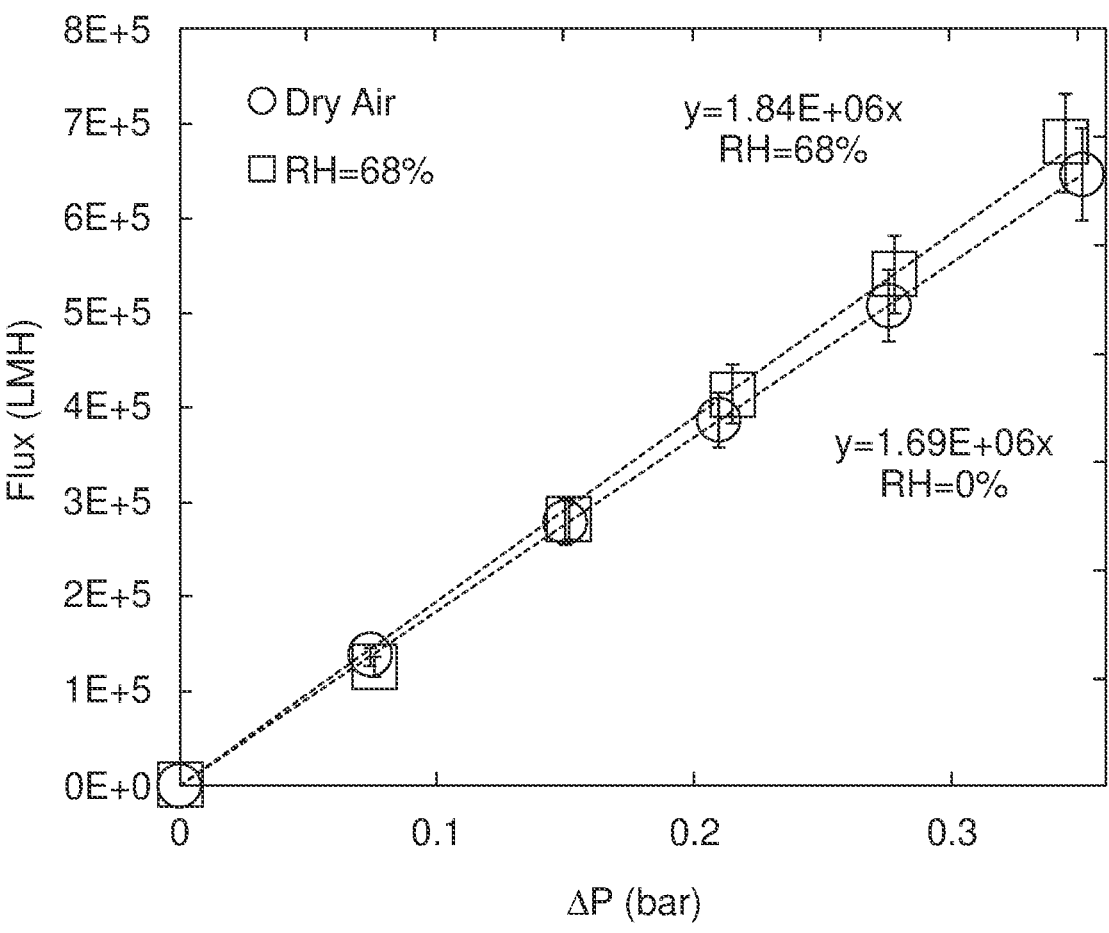

FIG. 19 shows the effect of relative humidity on membrane air permeability of PMAA-PVDF400 membranes. Dry air was introduced from an ultra-pure dry air tank and air with relative humidity of 68% was produced using a bubbler. Measured flow rate measurements normalized at STP.

Figure 20:
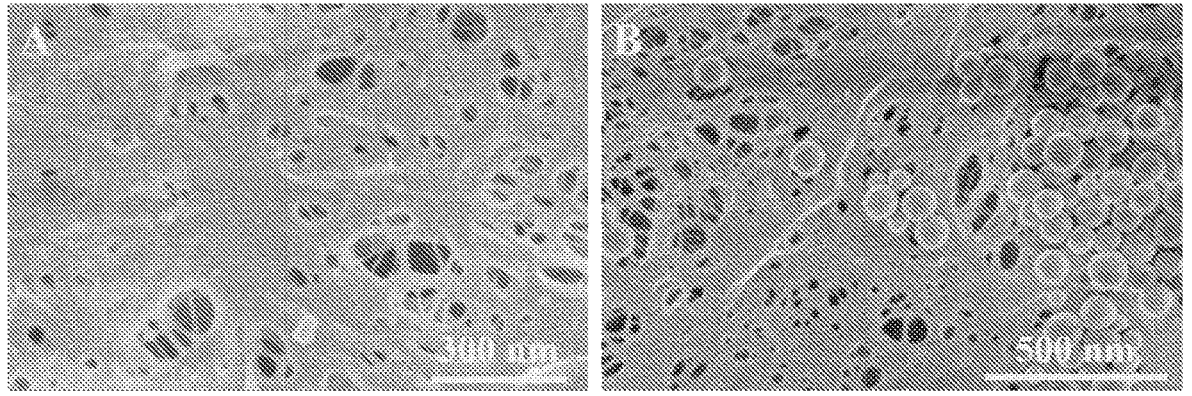

FIG. 20 is an SEM image of (A) blank PVDF400 membrane and (B) a PVDF400 membrane after PSL aerosol filtration for 10 minutes. Average size of aerosol particles was 100 nm in diameter and the relative humidity of feed stream was 68%. Testing was done with an aerosol generator inlet pressure of 2.1 bar.

Figure 21:
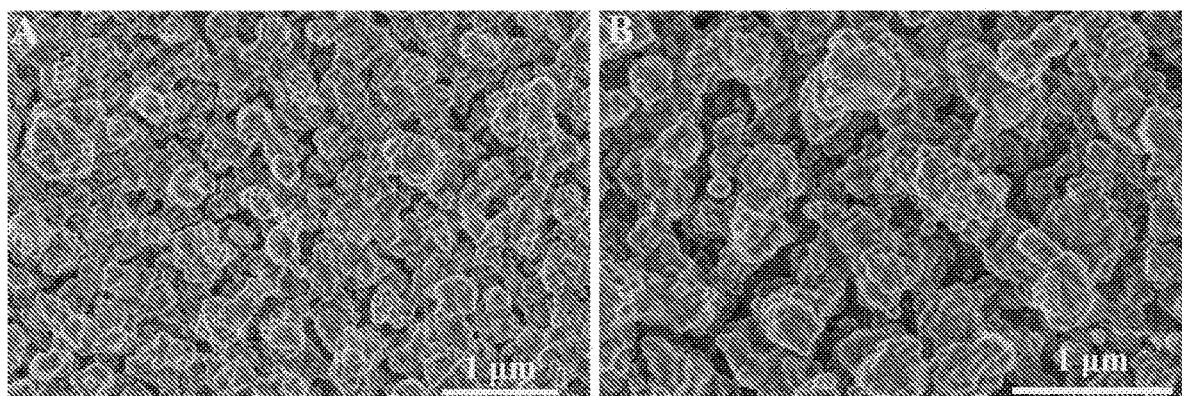

FIG. 21 is an SEM image of PVDF400 membrane after (A) PSL-COOH aerosol filtration of ~50 minutes and (B) PSL-GFP aerosol filtration for ~50 minutes. Average size of aerosol particles was 100 nm in diameter and the relative humidity of feed stream was 16-22%.

Figure 22:
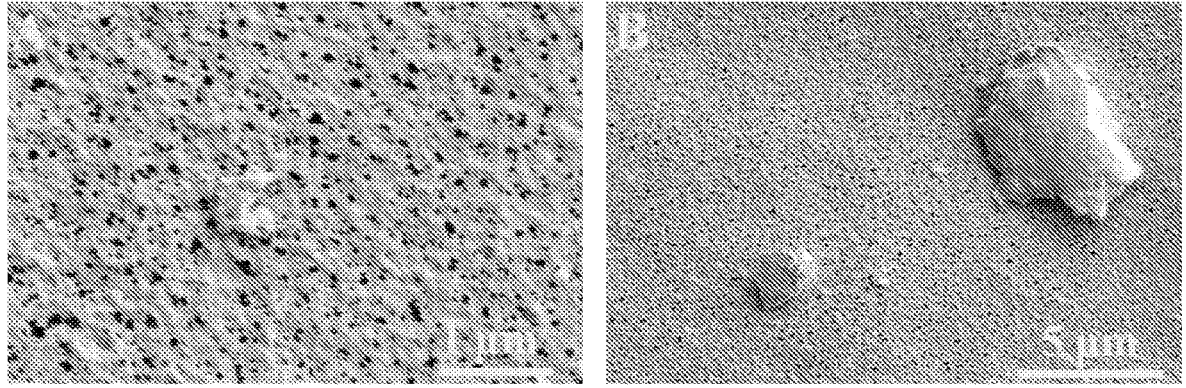

FIG. 22 is a membrane fouling of PMAA-PVDF400 membrane after ~500 L of ambient air filtration around 7.5 L/min with (A) 1 μm scalebar and (B) 5 μm scalebar.

Figure 23:
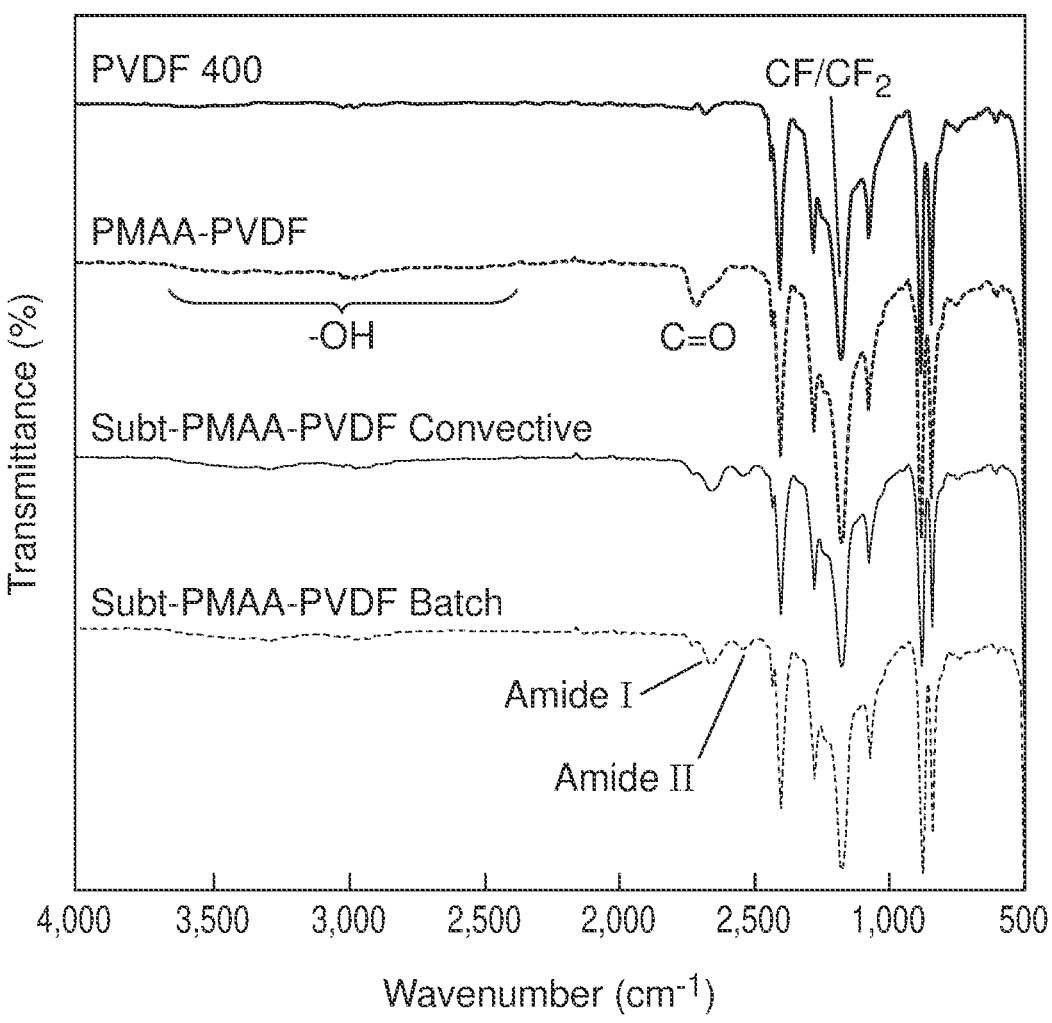

FIG. 23 is an FTIR spectra of a PVDF 400 membrane, a PMAA-PVDF membrane, a Subt-PMAA-PVDF that underwent batch enzyme functionalization, and a Subt-PMAA-PVDF membrane that underwent convective functionalization. All functionalized membranes had a PMAA weight gain of 3.4%. Subt-PMAA-PVDF samples were analyzed after the flow of dry air through the membrane. All spectra are an average of 32 scans with a resolution of 4 cm$^{-1}$.

Reference will now be made in detail to the present preferred embodiments of the antiviral masks and antiviral filters, examples of which are illustrated in the accompanying drawing figures.

DETAILED DESCRIPTION

Figure 1:
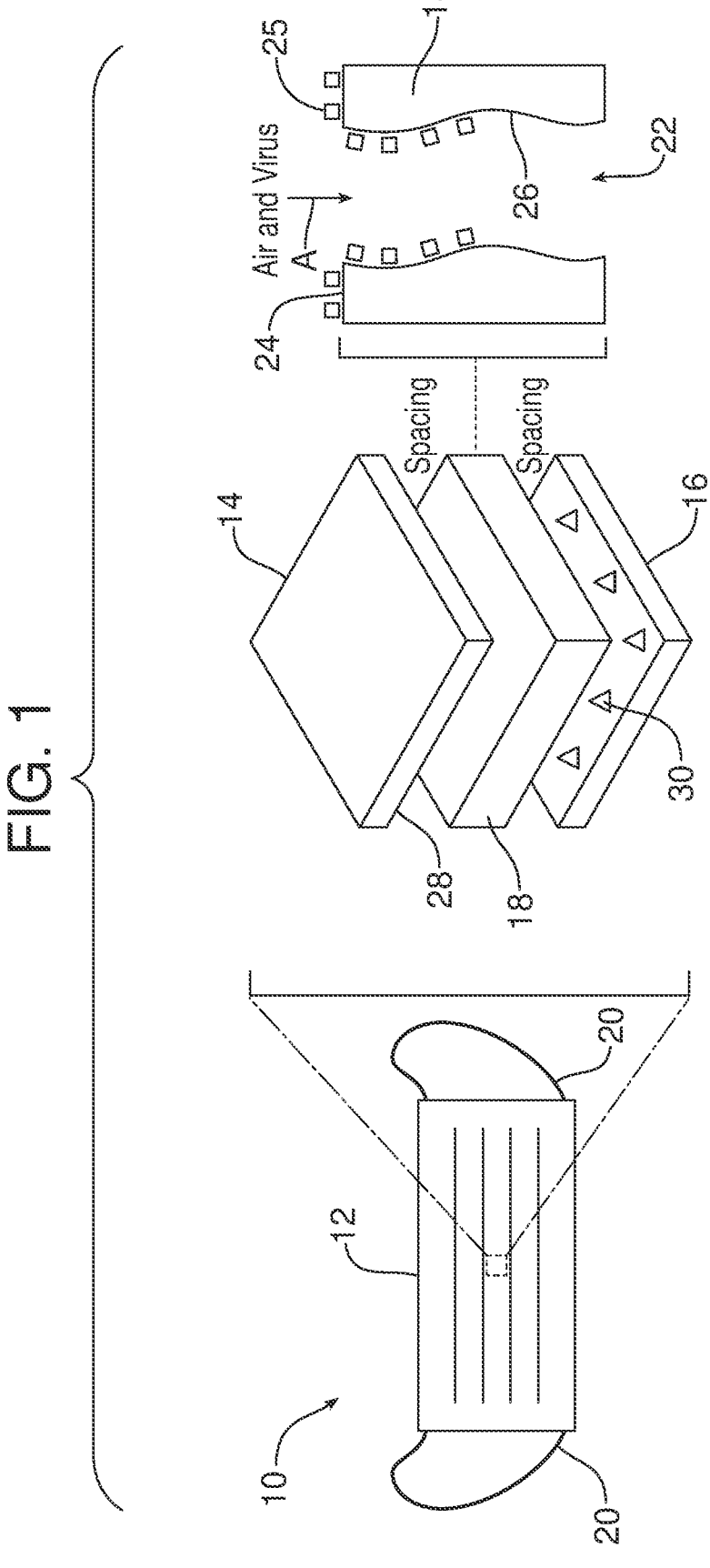
FIG. 1 is a schematic illustration of one possible embodiment of the antivirus mask.
Figure 2:
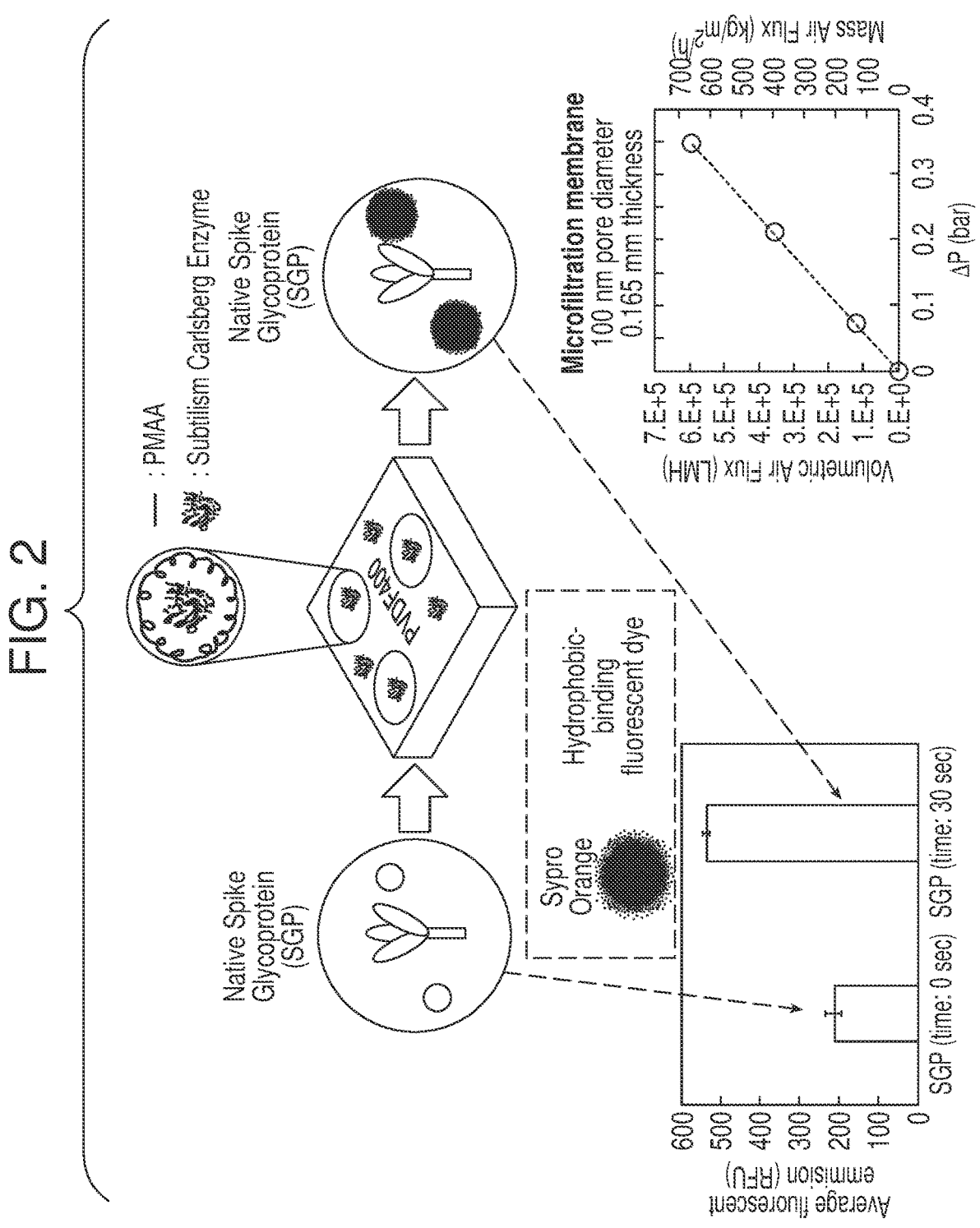
FIG. 2 is an overall graphical abstract.

Reference is now made to FIGS. 1 and 2 which illustrate a new and improved antiviral mask 10. Antiviral mask 10 includes a body 12 that includes an air permeable outer layer 14, an air permeable inner support layer 16 and a breathable, microporous polymeric membrane 18 sandwiched between the inner and outer layers. Two securing straps 20 are connected to the body 12. In the illustrated embodiment, one securing strap 20 extends from each side of the body 12 so as to be adapted to wrap around the ears and secure the antiviral mask 10 in place over the nose and mouth of the user in a manner consistent with state of the art face masks. The outer layer 14 may be made from any appropriate material including, but not necessarily limited to woven or nonwoven cellulose, cellulose acetate, cellulose triacetate, polyester, polypropylene and PVDF. The inner layer 16 may be made from any appropriate material including, but not necessarily limited to woven or nonwoven polyester, cotton, cellulose, polysulfone, polypropylene and nylon.

In some embodiments of the antiviral mask and filter 10, the polymeric membrane 18 and the inner, support layer 16 may be made as a single monolithic structure. In some embodiments of the antiviral mask and filter 10, there is no outer layer 14 and the mask and filter consists of only the polymeric membrane 18 and the inner support layer 16. In some embodiments of the mask and filter 10, the mask and filter only consists of the outer layer 14 and the polymeric membrane 18. In some embodiments of the mask and filter 10, the mask and filter consists only of the polymeric membrane 18.

The polymeric membrane 18 has a thickness of between about 30 microns and about 500 microns, a porosity of between about 20% and about 90%, an average pore size of between about 15 nm and about 300 nm and a water contact angle of between about 20° and about 115°. In some embodiments, the polymeric membrane 18 has a thickness of between about 100 microns and about 150 microns, a porosity of between about 20% and about 80%, an average pore size of between about 40 nm and about 200 nm and a water contact angle of between about 50 and about 100. In one particularly useful embodiment, the polymeric membrane 18 has a thickness of between about 50 microns and about 100 microns, a porosity of between about 40% and about 80%, an average pore size of between about 50 nm and about 150 nm and a water contact angle of between about 50 and about 180. The polymeric membrane 18 may have asymmetric pores and a low pressure drop across the membrane of less than about 5 psi or 34.47 kPa.

The polymeric membrane may be made from any appropriate polymeric material adapted to trap a virus and filter a virus from breathable air passing through the mask 10, including the membrane 18. Appropriate materials include, but are not necessarily limited to polyvinylidene difluoride, polysulfone, polypropylene, cellulose, poly (methacrylic acid) functionalized polyvinylidene difluoride, poly (methacrylic acid) functionalized polysulfone, poly (methacrylic acid) functionalized polypropylene (PP), poly (methacrylic acid) functionalized cellulose and combinations thereof.

Such polymeric membranes include a plurality of pores 22 of a size to allow the passage of breathable air while providing virus filtering activity. In the illustrated embodiment, at least one face (the upstream face 24 (note action arrow A showing air flow direction through mask)) and the internal walls 26 of the pores 22 are functionalized with a proteolytic enzyme, a virus denaturing agent and combinations thereof. Advantageously, the pores 22 provide a confined space within the internal pore walls 26 that promotes contact between any virus not captured on the upstream surface 24 of the membrane 22 and the proteolytic enzyme and/or virus denaturing agent 25 carried on the internal wall thereby denaturing that virus.

Substantially any proteolytic enzyme suitable for the intended purpose may be used for functionalization of the polymeric membrane including, but not necessarily limited to subtilisin, trypsin, papain, proteinase K, chymotrypsin, elastase and combinations thereof. Similarly, substantially any virus denaturing agent suitable for the intended purpose may be used for functionalization of the polymeric membrane including, but not necessarily limited to an antibody, a chemical agent that reduces a disulfide bond of the virus to an —SH group, a RBD (receptor-binding domain)/ACE2 interaction inhibitor, heparin, glycyrrhizic acid and combinations thereof. Useful chemical agents for reducing disulfide bonds of a virus include, for example, dithiothreitol and tris (2-carboxyethyl) phosphine (TCEP).

One or more embodiments of the antiviral mask or filter 10, may include a coating 28 of graphene oxide, lignin sulfonate or combinations thereof which functions to provide added protections with known antiviral and antimicrobial properties. The coating 28 may include an antiviral agent. Appropriate antiviral agents included in the coating 28 include, but are not necessarily limited to quaternary amine, an essential oil derivative having antiviral properties, copper nanoparticles, gold nanoparticles and combinations thereof.

Such a coating may be provided on any or all of the surfaces of the outer layer 14, the inner layer 16 and the polymeric membrane 18 so long as the pores 22 of the membrane remain open sufficiently to allow the wearer of the antiviral mask 10 to breath as necessary.

Substantially any embodiment of the antiviral mask and filter 10 may also include a fluorescent virus tagging agent 30 for the purpose of confirming the denaturing of the virus by the proteolytic enzymes or antibodies provided on the antiviral mask 10. Substantially any fluorescent virus tagging agent known in the art to be useful for this purpose may be used including, for example, Sypro Orange, a hydrophobic-binding fluorescent dye.

It should be appreciated that the antiviral mask and antiviral filter 10 of this document may provide general protection against airborne viral infections. In addition, the antiviral mask and antiviral filter may be tailored, tuned or customized to provide protection against airborne viral infection from a specific virus. An antiviral mask or filter specifically targeting the SARS-CoV-2 virus is described in the following Experimental section of this document.

EXPERIMENTAL

1. Introduction

The SARS-CoV-2 virus is a single strand RNA-enveloped β-coronavirus and is transmittable via close contact with an infected subject, primarily through the emission of hydrated aerosol particles. This virus, with an average size of 29.9 kb $(2.99\times10^{-6}$ nm$^2)$, contains several primary structural proteins, consisting of the small envelope glycoprotein (E), the nucleocapsid protein (N), the spike glycoprotein (S) and the membrane glycoprotein (M). The spike glycoprotein (SGP), with a molecular weight of roughly 150 kDa, has become the focus of SARS-CoV-2 research, as it facilitates the infection of the host cells via this transmembrane protein's proteolytic cleavage. After cleavage, the two primary subunits of the SGP facilitate viral host entry by attaching to the ACE2 receptor (S1 subunit) and initiating membrane fusion by uncovering the hydrophobic amino acid side chains for membrane fusion (S2 subunit). Based on this process, it could be hypothesized that the disruption/denaturing of the SGP would lead to the loss of the virus' transmissibility.

Proteins denaturation is a process that often consists of the unraveling or change in conformation of the protein's secondary and tertiary structure. This process results in the loss of the native protein configuration and functionality, which often exposes the protected hydrophobic regions of the protein as well. There are several methods for protein denaturation, such as heat treatment, urea treatment, acidic or basic pH treatment, and alcohol treatment, that denature mainly via the disruption of the protein's hydrogen or/and disulfide bonds. However, proteins' functionality is very sensitive to the conformation of the protein itself, thus indicating that other milder protein denaturation options could be available to result in protein function loss. Studies have indicated that enzyme treatment could be one such method, as it can possibly denature proteins by causing a small conformation change, such as a minute change in the dihedral angles of the amino acid residues. A serine protease enzyme with high stability, such as Subtilisin Carlsberg (used in laundry detergent industry), could be ideal for process, as the enzyme is stable under non-ideal conditions, the enzyme's functionality is well understood, and substrate-binding modifications are highly studied. Additionally, Subtilisin's flexible enzymatic process has been proven to be independent of the primary structure of the substrate's cleavage site, thus indicating that the enzyme should interact with a wide range of substrates, such as the SGP of SARS-CoV-2.

The efficacy of respiratory masks has been extensively investigated in recent years, due to the SARS-CoV-2 pandemic. The N95 mask, which primarily consist of multi-layered non-woven polypropylene (PP), is the most commonly-used mask in the healthcare industry, yet it does not offer consistent prevention of virus transmission. Lee et al. found that only 70% of the 45 tested N95 masks (4 different models) offered greater than 90% rejection of NaCl aerosol particles of coronavirus-like size (40-200 nm), thus showing a large potential danger for virus transmission. Polymeric membranes, such as poly(vinylidene fluoride) (PVDF), could be appropriate to mitigate this danger and offer greater aerosol particle capture than N95 masks, due to the ability to precisely control the membrane pore size and structure. PVDF membranes with exact variables (thickness, porosity, pore size) could be developed for appropriate air permeability and pressure drop, as well as consistently high capture of SARS-CoV-2 virus-size particles (60-140 nm). Additionally, further transmission protection could be incorporated via enzyme functionalization of membrane surface and pores. This functionalization process could allow for inactivation of SARS-CoV-2 droplets that reach the membrane filter surface via SGP denaturation.

The enzyme immobilization limit and strength can be further enhanced with the addition of a non-toxic polymer, such as poly(methacrylic acid) (PMAA) with a pKa of ~5, via surface and pore functionalization. Due to this polymer's negative charge above its pKa for the carboxylic acid groups, PMAA is able to electrostatically attract Subtilisin A enzymes, which are positively charged below their isoelectric point (pI) of 9.4. A similar method has been used in the past to incorporate negatively-charged enzymes into membranes after the addition of positively-charged poly(allylamine hydrochloride) into a membrane domain containing carboxylic acid groups. Furthermore, the presence of water has been proven to be necessary for enzyme structure and function, thus functionalization with PMAA, which has the ability to retain water, could enhance the stability and function longevity of the immobilized enzymes.

This Experimental section relates to the development of a membrane mask and air filter with enhanced aerosol particle capture, as well as the ability to inactivate coronaviruses (specifically, SARS-CoV-2) through enzyme functionalization, greatly reducing both individual transmissibility of the virus and the disease spread. Specific membrane variables (thickness, porosity, pore size) appropriate for mask and air filtration applications were developed and compared to commercially available respiratory masks. The immobilization of various enzymes (Subtilisin, Trypsin) onto PVDF and PMAA-PVDF surfaces was analyzed with different functionalization methods (batch, convective flow). The membrane's enhanced particle filtration and capture (based on particle size) abilities were tested and compared to commercial N95 masks. The denaturation of the SGP of SARS-CoV-2 (wild type) by enzyme-functionalized membranes was tested at low hydration.

2. Materials and Methods

2.1. Chemicals, Masks and Membranes

Full-sized commercial polyvinylidene fluoride microfiltration membranes (PVDF-400, porosity: 0.4, thickness: 165 μm, average pore diameter: 100 nm), polysulfone ultrafiltration membranes (PS35, porosity: 0.035, thickness: 224 μm, average pore diameter: 15-20 nm), and thin-film composite nanofiltration membranes (NF270, thickness: 152 μm, average pore diameter: 0.8 nm) were provided by Solecta, Inc., Oceanside, Calif. Polycarbonate Isopore membranes (diameter~100 nm) were purchased from Millipore Sigma (GTTP04700). Hydrophilic PVDF Durapore membranes were purchased from Millipore Sigma (100 nm: VVLP09050, 220 nm: GVWP09050). NIOSH-approved N95 masks were purchased from Fastenal (SKU: 1049938) and surgical masks were purchased from Yantai Fushuntai Biotechnology Co.

Subtilisin A/Carlsberg was purchased from Sigma Aldrich (P5380) and N-Succinyl-Ala-Ala-Pro-Phe p-nitroanilide, a polypeptide that has a product (4-nitroanaline) which is easily measured via UV-Visible spectroscopy, was purchased from Sigma Aldrich (S7388). 4-nitroanaline (to make standard curve for concentration analysis to test enzyme activity) was purchased from Millipore Sigma (185310). For membrane and pore functionalization, potassium persulfate (Acros Organics, CAS: 7727-21-1), methacrylic acid (stab. with 250 ppm 4-methoxyphenol, Alfa Aesar, CAS: 79-41-4), and N,N'-Methylenebisacrylamide (Alfa Aesar, CAS: 110-26-9) were purchased. Technical-grade ISOPAR-G was bought from Univar. Sypro Orange fluorescent gel dye was purchased from Sigma Aldrich (S5692). Spike glycoprotein of SARS-CoV-2 was made by plasmid transfection into mammalian cells and purchased from Dr. Kee-Yuen Martin Chow from the College of Medicine at the University of Kentucky. Unfunctionalized polystyrene latex nanoparticles (average diameter: 100 nm) were purchased from Sigma Aldrich (LB1) and COOH-functionalized polystyrene latex nanoparticles (average diameter: 100 nm) were purchased from Bangs Laboratories (PCO2004). Green fluorescent protein (GFP) with 6-histidene tagging at the N-terminus was made in Dr. Yinan Wei's lab from the Department of Chemistry at the University of Kentucky. For nickel functionalization of PSL-COOH particles for his-tag attachment, nickel (II) chloride hexahydrate was purchased from Sigma Aldrich (7791-20-0).

2.2 Membrane Functionalization

2.2.1 PMAA Functionalization of PVDF

PMAA was introduced into the commercial PVDF 400 membranes using a technique similar to one detailed previously for the creation of membranes containing PAA or PMAA. PVDF 400 membranes were weighed before this process. A polymerization solution in deoxygenated water (pH of 5.3-6.5) was then created from methacrylic acid (MAA; monomer), N,N'-Methylenebisacrylamide (MBA; crosslinker), and potassium persulfate (KPS; initiator). To limit polymerization before the introduction of the solution into the membrane pores, MAA and MBA were dissolved initially in a separate solution from the initiator; the two solutions were combined prior to being exposed to the membranes. The weight fraction of MAA in the final solution varied from 0.06-0.15 and the amount of MBA and initiator were each equivalent to 1 mol % relative to MAA. Using vacuum filtration, solutions were drawn through the pores of the membrane multiple times through the top of the membrane and a few through the back. As a result, PMAA was polymerized into the walls of the pores where it could subsequently immobilize Subtilisin Carlsberg within the pores. To limit the polymerization on the surface, residual solution was wiped away from the membrane. Membranes were then wrapped in a plastic wrapping, clamped between Teflon plates, and heated under a vacuum (P~0.6-0.7 bar vacuum) for 1.5-1.7 hours. After this time, the wrapped membranes were removed from between the plates and heated again under vacuum or at atmospheric pressure for ~30 minutes. Lastly, membranes were removed from the plastic wrappings and placed in the oven under vacuum or at atmospheric pressure for 15-30 min. During the time in the oven, membranes were heated to ~80°-90° C. After these reaction steps, membranes were cooled, rinsed with DI water, and dried. A final mass value was recorded to determine the amount of PMAA added to each membrane.

2.2.2 Enzyme Immobilization/Functionalization

Both PVDF 400 and PMAA-PVDF membranes were convectively immobilized with Subtilisin Carlsberg. For batch immobilization mode, 100 mL of 0.1 mg/mL solution of Subtilisin was stirred in a water filtration cell for 60 minutes. For convective immobilization mode, membranes were compacted once with a basic solution of sodium hydroxide in deionized water (pH=9) at 1 mL/min for 60 minutes and then again with deionized water at 1 mL/min for 60 minutes. The membranes were rinsed and immobilized with a 0.1 mg/mL solution of Subtilisin Carlsberg at approximately 0.67 ml/min for 60 minutes. Mass of enzyme immobilized was determined by analyzing the Subtilisin concentration of the functionalizing solution before and after the immobilization process with the UV-6300PC Double Beam Spectrophotometer (VWR) at a wavelength of 280 nm.

2.3 Air Filtration

2.3.1 Dry Air Filtration

Dry air filtration experiments were conducted using applied pressure from compressed extra dry grade air (Catalog Number: 11, American Welding & Gas). The humidity of the compressed dry air was confirmed using an in-line wireless humidity sensor (SensoNODE Blue-Parker). Polycarbonate in-line filter holders (In-Line Filter Holders, 47 mm, Pall Laboratory) were used as membrane/mask filtration cells. Air flow rate through the membrane was measured at various applied pressures using a digital in-line flowmeter (TSI 4043) to calculate membrane permeability. For commercial membranes (PVDF 400, PS35, NF270, Durapore, Isopore), air flow rate experiments were conducted in normal and reverse orientations. For example, normal orientation for PVDF is the thin PVDF layer exposed to the air inlet side, while the open polyethylene (PE) support layer is exposed to the outlet side, and vice versa for the reverse orientations. For commercial masks, air flow rate experiments were conducted in a normal orientation as well, meaning that the side of the mask that would be exposed to the ambient environment was the air inlet side, while the side of the mask that would be exposed to the human's mouth and nose was the air outlet side. The pressure drop (ΔP) across the membranes/masks were measured using a pressure manometer (Catalog Number: 33500-086, Manometer Pressure/Vacuum Gauge-VWR International) connected directly before and after the filter holder cell.

2.3.2 Ambient Air Filtration

The membrane/mask was placed in a filter holder (In-Line Filter Holders, 47 mm, Pall Laboratory) for the air flow inlet and air flow was generated using a vacuum pump (HCPS-Copley). A Next Generation Impactor (NGI) was included to mimic human lung pressure drop. A steady air flow rate of approximately 7.5 L/min was initially set using a critical flow controller (TPK2000-Copley) at a temperature of 23.5° C. and the decrease in air flow through the membrane/mask was monitored using the digital flow meter. Sinusoidal on/off flow rate testing was done over 1-minute intervals (30 seconds with flow on, 30 seconds with flow off).

2.4 Aerosol Particle Generation, Size Analysis, and Particle Count

Aerosolized PSL particles were generated using the TSI 3076, a collision-type aerosol generator that introduces PSL from a solution to a polydisperse aerosol. 2.1 bar of applied pressure was fed into the generator for aerosolization. The size of PSL particles were quantified using a dynamic light scattering (DLS) particle analyzer (Litesizer 500-Anton Paar). For permeate size distribution readings, 3 mL samples of the permeate were taken after bubbled into DI water (FIG. 17) and size measurements were volume-weighted with confirmed baseline within 1.000±0.01. A run time of 10 minutes was allowed to ensure adequate capture of PSL aerosol particles in the bubbled water. Met-One Instruments' GT-526S particle counter was used to count concentration of aerosolized PSL particles in air, categorized into different particle sizes. The membrane permeate after aerosol feed flow was captured in a closed-off module to allow for accurate particle count.

2.5 Enzyme Reactions 2.5.1 Solution Phase Reaction

The activity of the Subtilisin enzyme was tested in a solution phase with a polypeptide (N-succinyl-Ala-Ala-Pro-Phe-p-nitroanilide) that, upon proteolysis, releases 4-nitroanaline, which absorbs light at wavelength of 410 nm. Initial substrate concentration was 0.8 mM with an enzyme concentration of 0.12 mg/L. The reaction was conducted at 37° C. and a consistent pH of 7.8. pH was maintained by using a 50 mM Phosphate buffer. Activity was characterized with calculated values of $K_M$ and $V_{max}$. Wavelength readings were obtained using the UV-6300PC Double Beam Spectrophotometer (UV-Vis).

2.5.2 SGP Denaturation (Heat, Enzyme) Via Dynamic Scanning Calorimetry (DSC)

The confirmation of the proteins (denatured versus native) was determined by obtaining thermographs of protein solutions using a dynamic scanning calorimeter (DSC-Q200 by TA Instruments). The existence of a thermograph peak (temperature value confirmed by literature) indicated that the protein was active before DSC analysis, while the absence of a specific peak indicated that the protein was denatured before DSC analysis via a denaturing treatment method.

BSA protein solutions were initially tested to determine if this method was appropriate for determining protein denture by comparing the thermographs of a stock BSA solution with a heat-treated BSA solution. The heat treatment of BSA consisted of heating the solution to 90° C. for 60 minutes. SGP solutions of 1-2 mg/mL were tested to determine if Subtilisin denatures the protein in a similar manner as heat or alcohol treatment does. The thermograph of the SGP stock solution was compared to thermographs of a heat-treated SGP solution, a subtilisin-treated SGP solution (1 mg Subtilisin/mL), and an alcohol-treated SGP solution (50% alcohol). Heat treatment of SGP was conducted at 70° C. for 60 minutes. The lower limit of protein concentration in the sample is 0.5 mg/mL.

2.5.3 Enzyme-Functionalized Membrane Reaction (Solution Phase)-Sypro Orange

Sypro Orange, a dye that produces a fluorescent signal upon hydrophobic-domain interaction, was utilized to identify SGP denaturation. For thermal denaturation, SGP in 20 mM HEPES ((4-(2-hydroxyethyl)-1-piperazineethanesulfonic acid) buffer was heated at 70° C. for 30 minutes. After the heating process, the solution was allowed to return to ambient temperature (23° C.) and was then combined with Sypro Orange. The heated sample was compared to an unheated sample of SGP combined with Sypro Orange in the same HEPES buffer. For each sample, 6 μL of 0.3 mg/mL SGP was combined with 30 μL of 20 mM HEPES buffer and 4 μL of 50× Sypro Orange solution. The fluorescent intensity was measured using a BioTek Synergy 96 well plate reader. 40 μL total volume was used with an excitation and emission wavelength of 483 nm and 568 nm, respectively, at 25° C.

In enzymatic denaturation of SGP, Subtilisin Carlsberg, a commonly used non-selective serine protease, was used to denature the SGP. To prevent the quenching interaction of Sypro Orange with hydrophobic segments of Subtilisin, membrane bound subtilisin was used such that SGP could be introduced in a liquid drop onto the surface of the membrane and interact with the enzyme without allowing the Subtilisin to enter the solution. As Subtilisin is held to the membrane with hydrogen bonding (not covalently bound), it is expected that there will be minor diffusion of Subtilisin into a water droplet on the membrane surface. To investigate the denaturation event while controlling for the diffusion of subtilisin into the water droplet, four different samples were made. Sample 1: 6 μL of 50× Sypro Orange solution (stock 5000×) in 34 μL of 1× Phosphate Buffered Saline (PBS) buffer. Sample 2: 6 μL of 50×Sypro Orange solution in 34 μL of 1×PBS buffer that had been placed on a Subtilisin immobilized PMAA-PVDF400 membrane for 30 seconds. Sample 3: 4 μL of 0.3 mg/mL Subtilisin (in PBS) that had been placed on a Subtilisin immobilized PMAA-PVDF400 membrane for 30 seconds, 6 μL of 50×Sypro Orange solution, and 30 μL of 1×PBS buffer. Sample 4: 4 μL of 0.3 mg/mL Subtilisin (in PBS) that had not contacted Subtilisin, 6 μL of 50×Sypro Orange solution, and 30 μL of 1×PBS buffer.

3. Results and Discussion 3.1. Membrane Characterization

Water filtration membranes are used for a variety of purposes, ranging from suspended solid separation (microfiltration-MF) and colloidal macromolecule filtration (ultrafiltration-UF) to the separation of low molecular weight molecules and monovalent salts (nanofiltration-NF). These different types of water filtration membranes are utilized for varying purposes, due to their unique flow profiles, transfer mechanisms, and pore size range. Each membrane type has a flow profile that is controlled by its respective membrane properties (porosity, pore diameter, thickness), which were experimentally quantified for the commercial membranes of this research to better understand the fluid/air flow regime through these membranes (Table 1).

TABLE 1

The classification, surface porosity, thickness, and mean pore diameter of three types of commercial membranes used in this study.

| Membrane | Membrane Type | Porosity | Thickness (μm) | Mean Pore Diameter (nm) |
|---|---|---|---|---|
| PVDF400 | Microfiltration (MF) | 0.4 | 165 | 100 |
| PS35 | Ultrafiltration (UF) | 0.03 | 224 | 15 |
| NF270 | Nanofiltration (NF) | NA | 152 | 0.8 |

Figure 3:
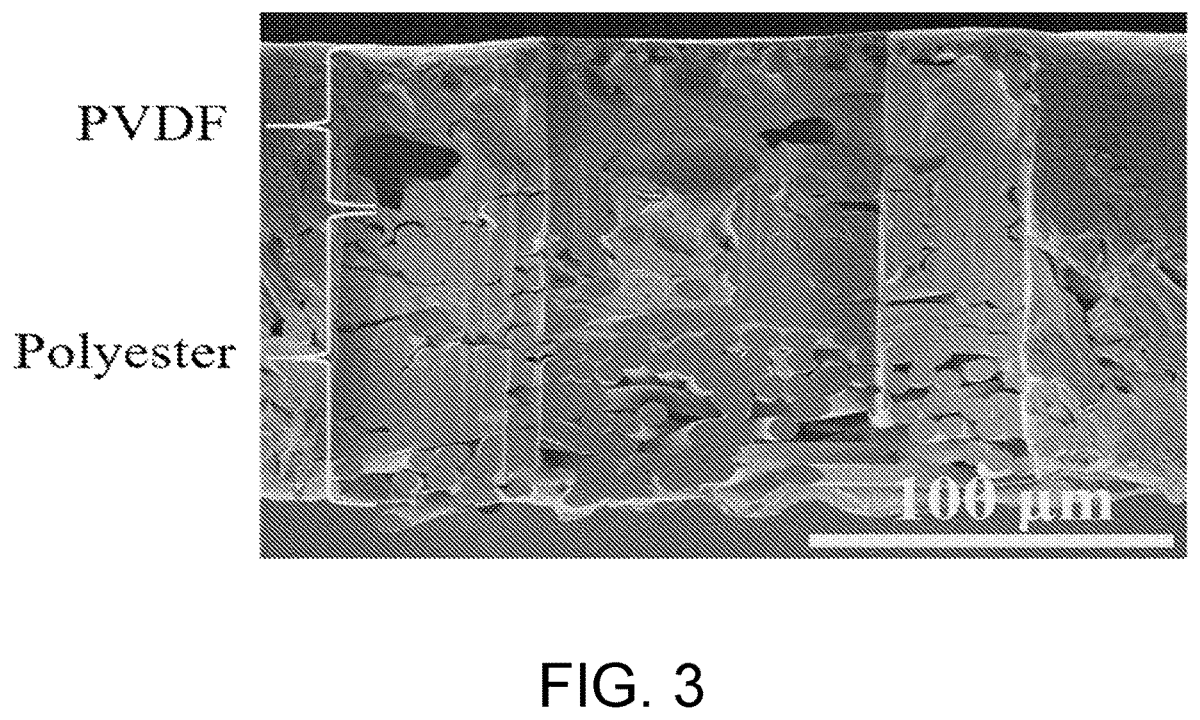

Many water filtration membranes are composed of two layers: a thin selective layer that is utilized for the separation/filtration process and an open support structure with a higher thickness. This design allows for (1) reduction of applied pressure needed for flow and (2) a support layer to reduce the probability of pore structure disruption during high-pressure filtration. The commercial MF membrane, PVDF400, follows this structure and is composed of a PVDF separating layer (thickness~40 μm) and a polyester support layer (thickness~125 μm), which was confirmed with SEM imaging (FIG. 3).

Contact angle is an important measure of membrane fouling rate and a common test for mask material. Mask material should have a relatively high hydrophobicity to allow a high rate of material drying, which is directly correlated to a lower virus transmission rate. The contact angle of blank PVDF400 was relatively high, starting at $86.2°\pm0.5°$ (t=2 seconds) and staying over 80°, indicating hydrophobic behavior (FIG. S1). Upon PMAA functionalization, though, the membrane exhibits a high contact angle initially ($72.2°\pm3.2°$), but dissipates to $27.6°\pm11.8°$ within 38 seconds of drop deposition, indicating that PMAA functionalization introduces hydrophilic behavior into the membrane system. The hydrophilic/hydrophobic balance may be important for viral deactivation aspects.

3.2. Effect of Membrane Characteristics on Flow Rate

Figure 4:
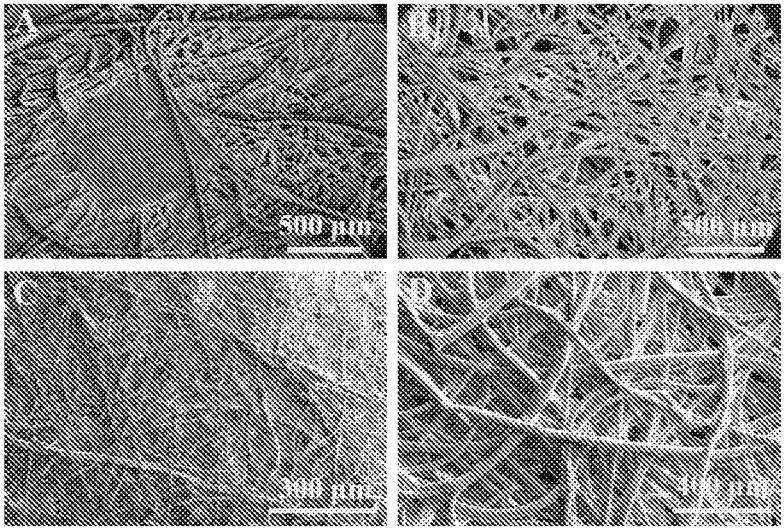
FIG. 4 are SEM images of N95 layers A, B, C, and D. In mask orientation, layer A is exposed to the open environment and layer D is exposed to the inside of the mask.

The air and particle flow through respiratory face mask have been extensively studied to understand aerosol particle filtration efficiency and pressure drop across the transport medium with the goal of determining a protection factor (PF) for the respective material. N95 respiratory masks and surgical masks are most commonly fabricated from multi-layer non-woven polypropylene (PP) (FIG. 4), and, due to the random nature of this non-woven system, the effects of certain mask variables (e.g. thickness) are more challenging to predict. Kumar and Lee reported that the complex flow of air through these mask materials can be characterized by complex mass transfer equation, derived from the system's momentum balances.

Fluid flow through a porous microfiltration or ultrafiltration membrane can be expressed in simpler terms than existing respiratory face masks, due to the sieving transport flow occurring through pores of similar and controlled diameter. Due to this membrane structure, the effect of membrane variables (thickness, porosity, pore size) on flow can be predicted more accurately than that of mask materials. Convective flow of an incompressible fluid through a porous membrane, due to a differential pressure driving force, can be expressed by the Hagan Poiseuille equation, applied to a pressure-driven pore flow membrane model:

$$J = \frac{\varepsilon r_p^2}{8\mu} \times \frac{\Delta P}{\delta} \tag{1}$$

where J is volumetric flux, $\varepsilon$ is membrane porosity, $\mu$ is the dynamic viscosity of the flowing liquid, $r_p$ is the average pore radius, $\Delta P$ is pressure difference across the membrane, and $\delta$ is the thickness of the membrane. From this equation, a positive relationship between flux and porosity, as well as pore radius, can be established, while a negative relationship between flux and thickness is observed.

Air flow through a porous membrane, though, cannot be expressed using the Hagan Poiseuille equation, as it does not state flow as a function of density. The density of air, as a compressible fluid, is affected by different variables, such as temperature, pressure, and relative humidity, which can vary significantly in pressure-drive flow systems. Air flow through porous membranes must take density into account, similarly to Kumar and Lee's momentum balance, thus one can use Ergun-type equations (commonly used for packed bed column pressure drop calculations) could be applied to membrane air permeation situations.

Figure 5B:
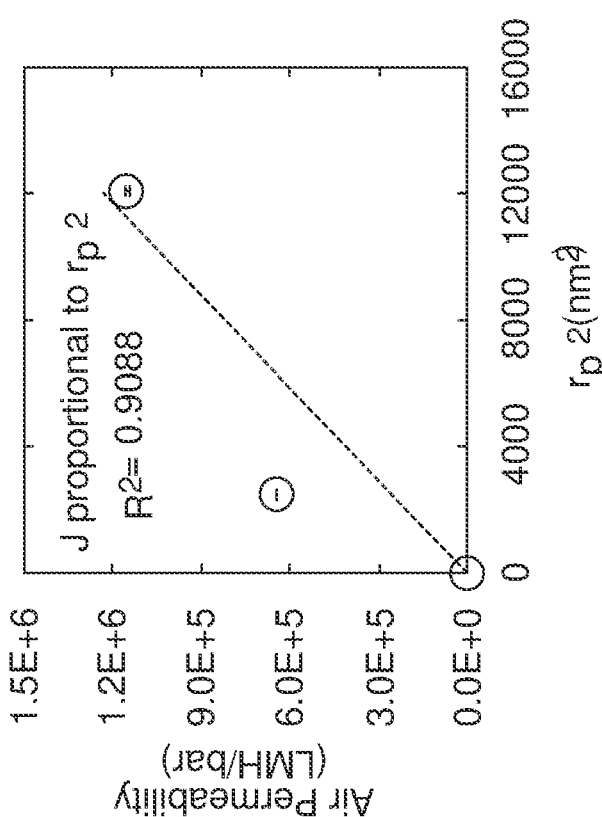
Figure 5A:
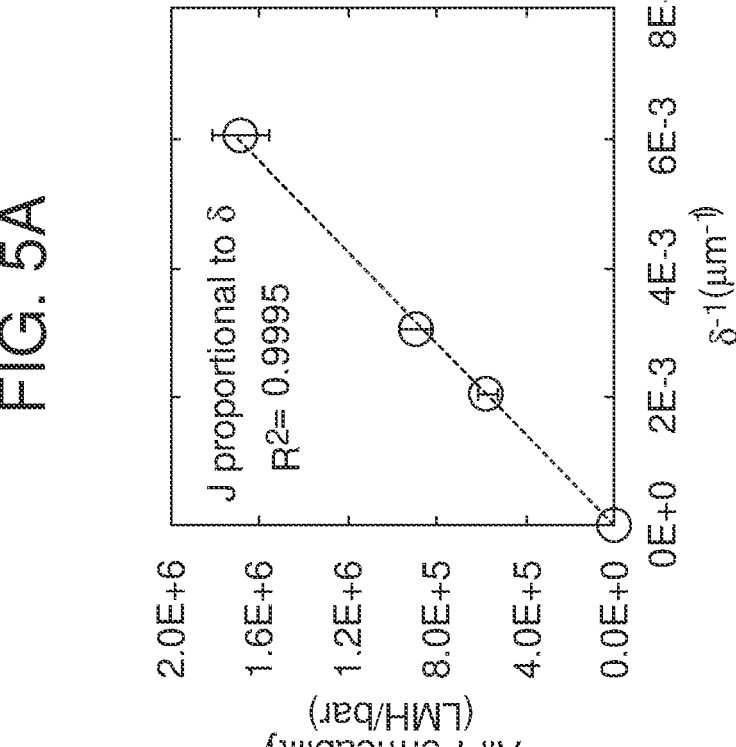

The creation of a membrane-based air filter is highly dependent on the breathability and air flow through that material and must be comparable to the respective values of commercially-available face masks. To reach these values, the control of certain membrane variables can be utilized to obtain predictable flux changes, such as a change in membrane thickness resulting in a proportionate change in volumetric/mass flow rate through the membrane (Eqn. 1 and 2). To test the permeability control by membrane variables, as well as the validity of the Ergun equation, the linear relationship between membrane permeability and certain variables (thickness, pore radius) were tested experimentally for commercial water filtration membranes. The relationship of thickness was tested by only changing the thickness of PVDF400 membranes (via membrane stacking) while retaining consistent porosity and mean pore size (FIG. 5A), while the relationship of pore size was tested by testing two different commercial PVDF Durapore membranes of varying pore size, but same porosity and thickness (FIG. 5B). The obtained $R^2$ value of 0.9995 and 0.9088 for inverse thickness and pore radius squared, respectively, indicate a strong linear relationship between these variables and air permeability, thus confirming the ability to control the air permeability of water filtration membranes with changes in membrane parameters.

MF membranes are often characterized by their water or air permeability, but there has not been work on mathematically determining the air permeability of a porous commercial water filtration membrane, such as PVDF400. The relationship (resulting in precise control of air permeability) can be utilized to predict the air flow through almost any porous membrane material with the availability of accurate values for porosity, pore radius, and thickness. The tortuosity of membranes will have an effect on the air permeability, but, due to the complexity of obtaining values for tortuosity, its effect will not be considered. The air permeability of various MF membranes was experimentally determined and normalized with respect to porosity, pore radius, and thickness to estimate the air permeability of a Polycarbonate Isopore membrane (porosity: 0.138, pore diameter: 220 nm, thickness: 45 μm) (FIG. 6). Based on a linear relationship between air permeability ($kg/m^2/hour$) and a correlation factor for membrane variables (porosity, pore radius, thickness), the Isopore membrane was estimated to have an air permeability of 1921 $kg/m^2/hour$. This, compared to the experimental Isopore permeability of $2206\pm45$ $kg/m^2/hour$, indicates that the air permeability of a porous water filtration membrane can be accurately estimated using membrane variable of porosity, pore radius, and membrane thickness.

3.3 Comparison Between Membrane and Mask Performance—Flow and Aerosol Filtration Commercial water filtration membranes, containing hydrophobic or hydrophilic characteristics, have been extensively studied for virus particle separation/capture in liquid media, but their efficiency for aerosol separation/capture in air phase has not been previously investigated. The dry air flux behavior of commercial PVDF400 (MF), PS35 (UF), and NF270 (NF) membranes were experimentally determined and compared to their corresponding water fluxes (FIG. 7). Similar trends were observed in the dry air flux to that of the water flux, such as MF membranes having the highest permeability and a linear correlation between applied pressure and air flux, thus indicating that these water filtration membranes could be appropriate for transition from water to air flow and aerosol capture applications.

The PVDF400 MF membrane was determined to be optimal for mask usage because of its superior air permeability (compared to that of UF and NF membranes) without having an average pore size greater than 100 nm and because PVDF membranes have been proven to have high aerosol filtration capabilities upon proper design. The dry air permeability of this MF membrane, along with only the polyester support, was experimentally compared to commercial respiratory facemasks (surgical mask, N95) (FIG. 8). These experiments were done with dry air and it was proven that the change of air permeability of PVDF membranes using air of different RH values was proven to be negligible (within standard deviation) (FIG. 19). The air permeability of the N95 and surgical mask are superior to that of the commercial PVDF400 membrane, indicating that a PVDF membrane with different properties would be ideal to match the capabilities of these commercial masks.

It has been proven that PVDF membranes can be fabricated specifically to have high gas permeabilities, indicating that PVDF400 performance is not the upper limitation of this material's air permeability. Using previously-determined relationships (FIG. 5 & FIG. 6) and membrane variables from existing commercial membranes (Table S1), mathematical modelling was conducted in order to determine values for the membrane variables of a PVDF membrane that can match the air flux of commercial N95 masks at the average human breathing pressure of 0.08 bar. Two different membrane designs are proposed: one with no pore size change (optimal for SARS-CoV-2 virus capture) and one including pore size change (Table 2). The air flow rates of these proposed membranes indicate that PVDF MF membranes can be easily fabricated to have comparable air fluxes to that of respiratory face masks at human breathing pressures.

TABLE 2

Proposed membrane variables for calculated membrane air flux at 0.08 bar. Commercial N95 mask found to be 1.14E+06 LMH at 0.08 bar. Thickness stated does not include polyester support layer. Flow rate measurements normalized at STP.

| PVDF Membrane | Porosity | Thickness (µm) | Mean Pore Diameter (nm) | Air flux at 0.08 bar |
|---|---|---|---|---|
| Calculated Membrane A | 0.7 | 12.5 | 100 | 6.00E+05 |
| Calculated Membrane B | 0.7 | 12.5 | 220 | 1.01E+06 |

Aerosolized particles are the primary means of transport from one individual to another for the SARS-CoV-2 virus and can be captured by a material via four main mechanisms: inertial impaction, direction interception, diffusional interception, and electrostatic effects. The mechanism that occurs can vary greatly, as it is affected by the size of particle, type/composition of material, and, in the instances of membranes, which pore the particle is entering through. For respiratory face masks, aerosol filtration and capture are crucial for the protection of the wearer and has been highly research in recent years. For such testing, aerosolized polystyrene latex (PSL) and sodium chloride (NaCl) particles are commonly used.

In this research, PVDF400 membranes were functionalized with PMAA in order to increase the enzyme functionalization capacity of the membrane system. Prior to enzyme testing, PSL particles with a size similar to the SARS-CoV-2 virus (diameter-100 nm) were utilized to test the aerosol filtration efficiency of the membrane material. More specifically, the permeate size distribution of aerosolized PSL particles through PMAA-PVDF membranes were experimentally determined and compared to commercial N95 and surgical masks (FIG. 9). PMAA-PVDF membranes in normal orientation were observed to have a significantly lower particle size distribution than that of commercial N95 and surgical masks, while the same membrane in reverse orientation was observed to have similar permeate particle size distributions as that of N95 masks. This indicates that PMAA-PVDF membranes could offer greater protection to the individual from coronavirus (ex. SARS-CoV-2) particles than N95 and surgical masks, due to its more selective filtration in regard to particle size. The commercial surgical mask displayed a permeate particle size distribution similar to that of the feed, indicating that surgical masks offer little to no protection from SARS-CoV-2 particles, which has been observed in other studies. Material surface and cross-section characterization was conducted before and after aerosol testing using SEM (FIG. 20).

Figures 10A, 10B:
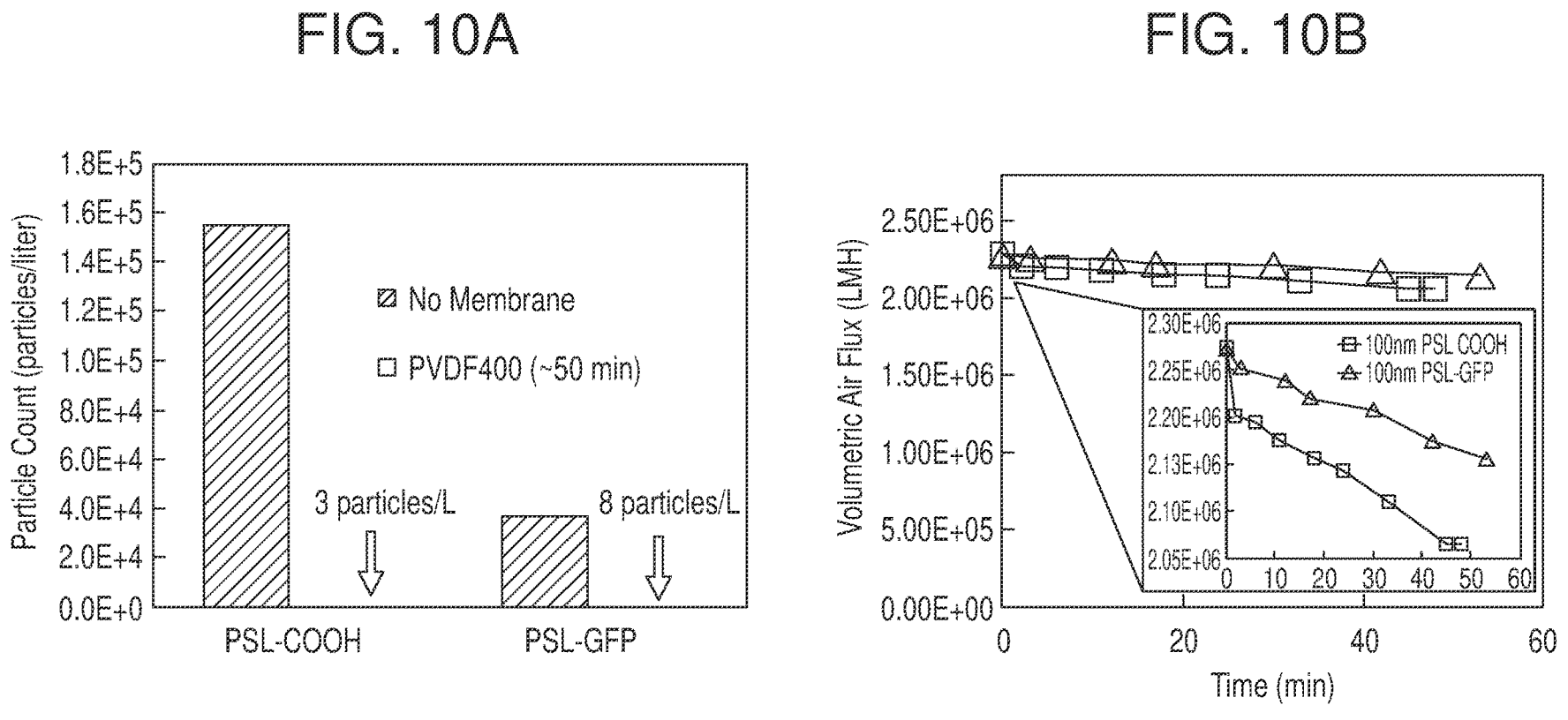

The SARS-CoV-2 virus particle has several surface proteins, which could negatively affect the filtration efficiency and mask performance by giving the particles a "sticky" nature, thus fouling the membrane more easily. The permeate particle count of PSL particles with COOH groups was experimentally determined through a PVDF400 membrane and compared to the particle count of PSL particles functionalized with GFP (His-Tag attachment) (FIG. 10A). It was found that, even after processing approximately 150, 000 100-nm PSL-COOH particles/L for 50 minutes, the permeate air was detected to contain virtually no 100 nm particles (less than 10). The particle counter is limited in that the lowest reported size is 300 nm particles, but the feed readings (150,000 100-nm particles/L) indicate that this level of measurement can be utilized to compare 100-nm particle concentrations. There was no statistically significant difference found between permeate particle count between PSL-COOH and PSL-GFP particles, indicating that, at these conditions, surface proteins do not negatively affect particle filtration efficiency (count-based) of PVDF-based filters or simply that there are not enough surface proteins to see an effect. The air flux of the membrane over time of processing aerosolized PSL-COOH and PSL-GFP particles was also investigated (FIG. 10B). The air flux drop of membranes that treated PSL-COOH particle air was found to be slightly greater than that of PSL-GFP-treated membranes. Both findings are strong indications that PVDF membranes can be utilized for respiratory face masks and closed-environment air filters for high-efficiency treatment of air with large concentrations of virus-based aerosol contaminants. Particles captured by the surface of the membrane were characterized by SEM (FIGS. 21-A and 21-B).

In realistic scenarios, the feed air will not contain PSL particles of similar size, but more complex particles of varying sizes and shape. To test the membrane's longevity of use as an aerosol filter material, an ambient air testing module with controlled air flow rate was utilized (FIG. 11-A). Using the critical flow controller with no breathing pattern, the flow rate though PMAA-PVDF and N95 material was set to an average breathing flow rate of humans (calculated from literature) and was monitored over time when passing ambient air using a vacuum pump (FIG.

11-B). Severe fouling of the N95 mask was observed with a 33.7% decrease in flow rate after 1273 L of ambient air filtration, while the PMAA-PVDF membrane showed minimal drop at normal and reverse orientation with 6.3% and 0.4% decrease in flow rate for normal and reverse orientation, respectively, after about 1200 L of ambient air filtration. This information can be utilized to estimate the longevity of use in a mask application with exhalation valve (inlet flow only). With an average breathing rate of 18 breaths/min, a 70-kg individual with an average tidal volume of 500 mL per breath could wear a PMAA-PVDF mask for multiple days (2 hours of daily use) without showing a significant drop in mask breathability, while the N95 mask could become difficult to use after a single day of use. This indicates that PMAA-PVDF masks could be used for longer periods before disposal, thus helping combat higher levels of plastic pollution that is present during periods of increased PPE usage. This equipment's critical flow controller can run for precise sinusoidal-like time frames to mimic inhalation breathing patterns, which was utilized to measure material air flux drop over time and compare to continuous flow mode (FIG. 11-C). PMAA-PVDF membranes displayed a slight flow rate drop during sinusoidal on/off cycles (30 second intervals), similar to continuous flow, while the separating layer of the N95 mask displayed a significantly lower flow drop during on/off cycles than that of continuous flow mode. Ambient particle fouling of membrane and mask material was characterized using SEM (FIG. 22).

Facilitating a greater understanding of how aerosolized particles are captured and retained in the membrane filters allows for predictions of long-term use and the upper-limitations of processing concentrations. Spherical particles, such as the PSL particles, can pack in different orientations, such as hexagonal lattice or face-centered cubic (FCC). The void fraction of PVDF400 and PMAA-PVDF400 membranes were determined experimentally (Table S2, Eqn. S1) and utilized to predict the maximum number of PSL particles (100 nm) at these two different packing structures (Table 3), indicating that the membrane filters have a high treatment capacity before needing to be replaced and that PMAA functionalization does not severely impede the membranes' particle capture abilities.

TABLE 3

Maximum number of aerosolized 100-nm PSL particles captured by a blank and PMAA-functionalized PVDF400 membrane at two different particle packing structures.

| Packing Structure | Membrane | Maximum Number Particles Captured/cm$^2$ |
|---|---|---|
| Hexagonal Lattice | PV400 | 1.34E+08 |
| | PMAA-PV400 | 1.31E+08 |
| FCC | PV400 | 1.64E+08 |
| | PMAA-PV400 | 1.61E+08 |

3.4. Synthesis and Performance of Enzyme-Functionalized Membranes

Subtilisin A, a stable protease enzyme, has the potential to disrupt the spike glycoprotein (SGP) of the SARS-CoV-2 virus, as the enzyme could attack the protein's peptide bonds. The rate of enzymatic activity can be quantified using the Michaelis-Menten equation for enzymatic rate (Eqn. 3).

$$v_o = \frac{V_{max}[S]}{K_M + [S]} \qquad (2)$$

where $v_0$ is the reaction rate, [S] is the substrate concentration, $V_{max}$ is the maximum reaction rate, and $K_M$ is the Michaelis-Menten constant.

Prior to enzyme functionalization, the activity of Subtilisin A was tested to ensure high enzymatic activity with a known polypeptide substrate via a Michaelis-Menten and Lineweaver-Burk plot (FIG. 11). In a solution phase reaction, the $K_M$ and $V_{max}$ values for this enzyme was determined to be 0.186 mM and 0.0362 mM/min, respectively, which agrees with literature sources.

Enzymatic functionalization of membranes has been commonly researched, both with site-directed and random enzyme immobilization. PMAA has the capabilities to enhance this process, as it introduces a charge interaction between the system (membrane) and the enzyme during functionalization. PMAA has a deprotonated carboxylic acid group at a pH above its pKa value of 4.8 and Subtilisin A has an isoelectric point (pI) of 9.4 (provided by Sigma Aldrich), which allows PMAA to attract Subtilisin A via electrostatic interactions in a solution of 4.8<pH<9.4. PVDF400 membranes were first functionalized with PMAA, resulting in 1.5-3% weight gain functionalization of the total membrane. The resulting PMAA-PVDF membranes were further functionalized with Subtilisin A in a batch and convective immobilization method (FIG. 12). The presence of PMAA in batch and convective immobilization mode yielded 84% and 125% more enzymes immobilized, respectively, than unfunctionalized PVDF400 membranes (by mass). This confirms that PMAA can enhance the enzymatic load immobilized on the membrane, which can allow for membrane masks and filters to treat higher concentrations of virus-contaminated air more effectively. PMAA and Subtilisin A functionalization was confirmed using FTIR (FIG. 23).

The stability of functionalized enzymes is vital to the long-term performance of the membrane system, especially with only random immobilization, which can be less stable than site-specific immobilization. To desorb any non-stable enzyme molecules in the system, convective water filtration through Subtilisin-PMAA-PVDF membranes was utilized. About 0-10% of Subtilisin A was observed to desorb from the functionalized membrane system for batch mode. This indicates that the majority of enzymes functionalized on the membrane system are stable and will not further desorb via membrane usage.

For the development of a mask or filter material, any functionalization, ideally, would not significantly affect the permeability of the material, as this can decrease how fast the material can treat a certain volume, negatively affect the breathability of a mask, and increase the costs associated with the generation of applied pressure for flow through the material. The effect of PMAA and Subtilisin functionalization on the air permeability of PVDF400 membranes were investigated upon surface/pore functionalization (FIG. 13). The amount of PMAA and enzyme functionalized can affect the drop in membrane permeability, but, in most cases, PMAA functionalization decreased the air permeability by roughly 13.41% on average. The enzyme immobilization in convective mode decreased the air permeability of the PMAA-PVDF membrane by about 8.82%, while the batch mode immobilization showed a more severe decrease of 29.73%. This shows that there is a minor permeability drop with PMAA and enzyme functionalization, and that convective immobilization may be optimal for reduction of permeability drop. The effect of this minor permeability drop, though, could be mitigated with fabrication of PVDF membrane with specific variables for higher air flow than PVDF400, as previously mentioned.

3.5. Deactivation of SGP with Enzymes and Functionalized Membranes

Proteins can be denatured in a variety of methods (pH, thermal treatment, urea treatment) and is not exclusive to just protein cleavage, but can also constitute as a simple conformation change. As previously mentioned, the SGP of the SARS-CoV-2 facilities host cell infection, thus the denaturation of this protein would most likely render the virus inactive. DSC has been used to detect protein denaturation in previous studies, as the energy involved in the denaturation process is measured and displayed as a peak in the equipment's generated thermographs. DSC was utilized in this research to determine if Subtilisin A is appropriate to denature the SGP by comparing the thermograph of SGP and Subtilisin to that of native SGP and thermally-denatured SGP (FIG. 14). A known protein, BSA, was utilized as a standard to ensure proper DSC usage and results that match with previous literature reports. The native SGP thermograph displayed a distinct peak at approximately 40° C., indicating that SGP is denatured in an environment of that temperature. The heat-treated SGP displayed no thermograph peak, indicating that the heat treatment already denatured the protein prior to DSC analysis. The enzyme-treated SGP showed no peak, similar to the heat-treatment signal, thus indicating that Subtilisin A denatured SGP similarly to high temperature-treatment, proving Subtilisin has the ability to denature native SGP.

Upon denaturation, the cleavage and/or unraveling of the protein has been proven to expose the hydrophobic domains that would otherwise be protected on the inside of the native protein. Sypro Orange, a hydrophobic-binding fluorescent dye, has been proven for protein denaturation studies, and was investigated to determine if the fluorescent intensity change was significant to identify SGP denaturation. After SGP thermal denaturation (70° C. for 30 minutes), the Sypro Orange compound showed a 25% increase in fluorescent intensity, showing RFU of 333 and 417 with standard deviations of 32 and 26 for native and thermally denatured, respectively. This increase in fluorescent intensity indicates that the hydrophobic regions of the SGP were exposed to Sypro Orange via heat denaturation and can be identified utilizing this compound.

Sypro Orange was utilized in this research to identify if Subtilisin-functionalized PMAA-PVDF membranes could denature SGP with minimum system hydration (1.35 µl/mm² of membrane surface) (FIG. 15). An increase in fluorescent intensity of SGP with the presence of membrane-immobilized enzyme (compared to SGP with no enzyme presence) was observed, showing that Subt-PMAA-PVDF400 membranes can denature SGP with minimal hydration. This indicates that the immobilized enzymes in the membrane system will maintain SGP denaturation activity in low-humidity respiratory face mask or indoor filter applications.

4. Additional Supporting Information

4.1. Contact Angle of Functionalized Membranes

To assess how the water intake of the membranes' changes with membrane functionalization, the contact angle was measured for PVDF 400 and PMAA-PVDF membrane samples over time. Prior to measurements, membranes were rinsed with deionized water and dried in a convection oven. Dried samples were taped onto glass slides and placed into a DSA 100 (KRÜSS Scientific Instruments, Inc.). The sessile-drop method was selected for contact angle measurements. This method was carried out by manually drawing and dosing a 3 µL DI water droplet (pH~6) and using the instrument to deposit the drop onto the membrane surface. Data collection was started (time=0) immediately after the deposition of the drop. Data were collected every 2 seconds for up to 84 seconds following the drop deposition. Three runs were done for each type of membrane. Drops with contact angles above 20° were fitted using the Young Laplace method while drops with contact angles below 20° were fitted as circles. These contact angles are shown over time in FIG. 18.

The average contact angle of PVDF 400 stayed nearly constant, only dropping from 86.2°±0.5° at a time of 2 seconds to 84.0°±0.5° at 38 seconds. In contrast, the average contact angle of the PMAA-PVDF membrane samples sharply decreased from 72.2°±3.2° to 27.6°±11.8° over the same time span. This decrease is due to the intake of water from the PMAA hydrogel present in the membrane. The ability of the PVDF-PMAA membranes to soak in water could potentially translate to enhanced enzyme performance under air conditions where humidity is present. Further work could be pursued to determine the ability of these functionalized membranes to retain water from humid air.

4.2. Membrane Variables of Commercial Water-filtration Membranes

TABLE S1

Key membrane variables (porosity, thickness, mean pore diameter, and air permeability) of various commercial membranes. Flow rate measurements normalized at STP.

| Membrane | Porosity | Thickness (µm) | Mean pore diameter (nm) | Air Permeability (single layer) |
|---|---|---|---|---|
| PV400 | 0.4 | 165 | 100 | $1.70 \times 10^6 \pm 1.29 \times 10^5$ |
| Polycarbonate Isopore | 0.138 | 25 | 200 | $1.80 \times 10^6 \pm 3.71 \times 10^4$ |
| Durapore1 (PVDF) | 0.7 | 125 | 100 | $6.49 \times 10^5 \pm 3.61 \times 10^3$ |
| Durapore2 (PVDF) | 0.7 | 125 | 220 | $1.16 \times 10^6 \pm 7.38 \times 10^3$ |

Scanning Electron Microscope (SEM-FIB)

Membrane surfaces and cross-sectional areas were characterized with the FEI Helios 660 Scanning Electron Microscope (SEM)/Focused Ion Beam (FIB) to identify porosity, pore diameter distribution, and general topography. An ultra-thin layer of silver (Ag) was applied on the membrane surfaces via sputter coating to give the polymeric material conductance for the electron imaging.

Void Fraction

The measurement of solvent uptake by PVDF 400 membranes was used to determine their void fraction. PVDF 400 membrane samples were cut into disks with an area of 19.6 cm2; multiple thickness measurements on each of these samples were taken with a micrometer to allow for the calculation of the membrane volume. ISOPAR-G was selected as the solvent because it was observed to thoroughly wet PVDF 400 membranes. Membrane samples were weighed, soaked in ISOPAR-G for about 2 hours, and then weighed again. Porosity values from each trial could then be calculated using Equation S1.

$$\phi = \frac{m_{solv}/\rho_{solv}}{A_{mem} * \delta_{mem}} \tag{S1}$$

where $m_{solv}$ is the difference in mass between the wet and dry membranes, $\rho_{solv}$ is the solvent density, $A_{mem}$, is the area of the membrane surface, and $\delta_{mem}$, is the measured thickness of the membrane. Table S2 shows the calculated void fractions and pore volumes ($m_{solv}/\rho_{solv}$) for PVDF 400 and PMAA-PVDF membranes.

TABLE S2

Experimentally-determined void fraction and estimated total pore volume of blank and PMAA-PVDF and PVDF 400 membranes with an area 19.6 cm2. PMAA-PVDF membranes had a weight gain of 1.2%-2.9%.

| Membrane | Void Fraction | Total Pore Volume (cm³) |
|---|---|---|
| PVDF 400 | 0.466 ± 0.013 | 0.163 ± 0.005 |
| PMAA-PVDF | 0.454 ± 0.030 | 0.159 ± 0.010 |

It can be seen that the PVDF 400 and PMAA-PVDF membranes had similar void fractions and pore volumes, indicating that the addition of PMAA did not greatly affect the amount of free space in the porous structure. This negligible difference in void fraction could be the reason that the decrease in air flow rate with the addition of PMAA into a PVDF 400 is low (13.4%), as seen FIG. 14.

4.3 Fourier-Transform Infrared Spectroscopy (FTIR) on Functionalized Membranes

FTIR spectroscopy was carried out on PVDF 400, PMAA-PVDF, and Subt-PMAA-PVDF membranes to verify the functionalization of the membranes with Subtilisin Carlsberg enzymes. Spectral data was collected with a Nicolet™ iS50 FTIR Spectrometer (Thermo Scientific™) at a resolution of 4 cm−1; reported spectra were averages of 32 scans. Subt-PMAA-PVDF membranes were analyzed after the filtration of ultra-pure dry air. FIG. 22 compares the FTIR spectra of PVDF 400, PMAA-PVDF, and Subt-PMAA-PVDF samples.

All membranes showed the CF/CF$_2$ peak at ~1,175 cm$^{-1}$ corresponding to PVDF 400 base membrane. As expected, the PMAA-PVDF membrane showed the broad —OH peak (~3600 cm$^{-1}$ to 2400 cm$^{-1}$) and the C=O (~1,710 cm$^{-1}$) corresponding to the carboxylic acid groups of PMAA. The Amide I and Amide II peaks on the spectra for the Subt-PMAA-PVDF samples at ~1,655 cm$^{-1}$ and ~1,540 cm$^{-1}$, respectively, verified the incorporation of enzymes in batch and convective mode.

5. Conclusion

This Experimental Section demonstrates the development of a membrane-based respiratory face mask and enclosed-environment filter that can denature the spike glycoproteins of coronaviruses, specifically SARS-CoV-2, and lead to virus deactivation. The air permeability of water-filtration PVDF400 membranes were compared to commercial N95 and surgical masks, and theoretical modelling of a PVDF membrane (by varying porosity, pore size, and thickness) proved that this material can be fabricated into a membrane of comparable air permeability to that of commercial masks. The air permeability of a commercial Isopore MF water-filtration membrane was accurately estimated, based on its porosity, thickness, and pore size, as well as air permeability data of other water-filtration MF membranes.

Aerosol capture of MF membranes were experimentally investigated and compared to face masks (N95, surgical), as this is an important aspect of a mask or filter, due to aerosolized particles being the main means of coronavirus transmission. PVDF400 membranes were determined to offer extremely high particle capture and rejection of both PSL-COOH and PSL-GFP particles (permeate-8 PSL-GFP particles/L compared to the feed concentration of 37,175 particles/L after 50 minutes of filtration), indicating that this is a suitable material for mask and air filter. PVDF400 membranes were successfully functionalized with PMAA (1.5-3% weight gain after polymerization) to increase the enzyme functionalization capacity of the membrane system. The average permeate aerosol size of unfunctionalized nano-sized PSL particles through PMAA-PVDF membranes was significantly smaller than that of N95 and surgical masks, indicating that PMAA-PVDF membranes can offer better protection from coronavirus aerosolized particles than commercial respiratory face masks.

To test realistic conditions, the fouling and air flow reduction of a PMAA-PVDF membrane with ambient environmental air filtration was quantified with an obtained air flow reduction of 6.3% and 0.4% for normal and reverse orientation, respectively, after about 1200 L of ambient air filtration in continuous flow mode, which was minute compared to the N95's 33.7% decrease after 1273 L of air filtration in continuous flow mode. In sinusoidal flow mode, PMAA-PV and N95's separating layer displayed similar minute decreases of air flow after 10 minutes of ambient air filtration. This result indicates that PMAA-PVDF membranes could possibly last longer than commercial N95 masks before needing to be replaced, but further testing (inlet-forward and outlet-backwards flow cycles) should be done.

PMAA functionalization of PVDF membranes was proven to enhance the membrane functionalization with Subtilisin Carlsberg enzyme by 84% and 125% for batch and convective mode, respectively. Subtilisin Carlsberg was determined to be an appropriate enzyme for SGP denaturation of the SARS-CoV-2 virus with the lack of peak presence of the enzyme-treated SGP DSC thermograph, comparted to a 40° C. peak on native SGP's thermograph. Subtilisin-functionalized PMAA-PVDF membranes, in turn, were proven to denature SGP with minimal membrane hydration (1.35 μl/cm$^2$ of membrane surface using a hydrophobic-binding fluorescent dye that displayed an average SGP fluorescent emission of 540 with 30 seconds of membrane contact and 213 without membrane contact. In low humidity environments, Subtilisin-functionalized PMAA-PVDF membranes have been proven to be a promising system of advancement towards the new generation of respiratory face masks and enclosed-environment filters that can significantly reduce coronavirus transmission by virus protein deactivation.

The disclosure may be considered to relate to the following items:

1. An antiviral mask, comprising:
   a body having a breathable, microporous polymeric membrane with a thickness of between about 30 microns and about 500 microns; and
   a securing strap connected to the body and adapted to secure the antiviral mask in place over the nose and mouth of a user.

2. The antiviral mask of item 1, wherein the polymeric membrane has a pressure drop of less than about 34.47 kPa.

3. The antiviral mask of item 1, wherein the polymeric membrane has a porosity of between about 20% and about 80%.

4. The antiviral mask of item 1, wherein the polymeric membrane has an average pore size of between about 15 nm and about 300 nm.

5. The antiviral mask of item 1, wherein the polymeric membrane has a thickness of between about 30 micron and about 500 micron, a porosity of between about 20% and about 80% and an average pore size of between about 15 nm and about 300 nm.

6. The antiviral mask of item 5, wherein the polymeric membrane is made from a material selected from a group consisting of polyvinylidene difluoride, polysulfone, poly (methacrylic acid) functionalized polyvinylidene difluoride, poly (methacrylic acid) functionalized polysulfone, poly (methacrylic acid) functionalized polypropylene (PP) and combinations thereof.

7. The antiviral mask of item 6, wherein the polymeric membrane includes a plurality of pores functionalized with a proteolytic enzyme, an antibody and combinations thereof.

8. The antiviral mask of item 7, wherein the proteolytic enzyme is selected from a group consisting of subtilisin, trypsin, papain, proteinase K, chymotrypsin, elastase and combinations thereof.

9. The antiviral mask of item 7, wherein the antibody is selected from a group consisting of a RBD (receptor-binding domain)/ACE2 interaction inhibitor, heparin, glycyrrhizic acid and combinations thereof.

10. The antiviral mask of item 7, further including a coating of graphene oxide, lignin sulfonate or combinations thereof on the polymeric membrane.

11. The antiviral mask of item 10, further including an antiviral agent in the coating.

12. The antiviral mask of item 11, wherein the antiviral agent is selected from a group consisting of a quaternary amine, an essential oil derivative having antiviral properties, copper nanoparticles, gold nanoparticles and combinations thereof.

13. The antiviral mask of item 10, further including a fluorescent virus tagging agent.

14. The antiviral mask of any of items 1-4, wherein the polymeric membrane is made from a material selected from a group consisting of polyvinylidene difluoride, polysulfone, poly (methacrylic acid) functionalized polyvinylidene difluoride, poly (methacrylic acid) functionalized polysulfone, poly (methacrylic acid) functionalized polypropylene (PP) and combinations thereof.

15. The antiviral mask of item 14, wherein the polymeric membrane includes a plurality of pores functionalized with a proteolytic enzyme, an antibody and combinations thereof.

16. The antiviral mask of item 15, wherein the proteolytic enzyme is selected from a group consisting of subtilisin, trypsin, papain, proteinase K, chymotrypsin, elastase and combinations thereof 17. The antiviral mask of item 15, wherein the antibody is selected from a group consisting of a RBD (receptor-binding domain)/ACE2 interaction inhibitor, heparin, glycyrrhizic acid and combinations thereof.

18. The antiviral mask of item 14, further including a coating of graphene oxide, lignin sulfonate or combinations thereof on the polymeric membrane.

19. The antiviral mask of item 18, further including an antiviral agent in the coating.

20. The antiviral mask of item 19, wherein the antiviral agent is selected from a group consisting of a quaternary amine, an essential oil derivative having antiviral properties, copper nanoparticles, gold nanoparticles and combinations thereof.

21. The antiviral mask of item 10, further including a fluorescent virus tagging agent.

22. The antiviral mask of any of items 1-13, further including an air permeable outer layer covering the polymeric membrane.

23. The antiviral mask of item 22, further including an air permeable, inner support layer whereby the polymeric membrane is sandwiched between the air permeable outer layer and the air permeable inner support layer.

24. The antiviral mask of item 23, wherein the fluorescent virus tagging agent is provided on the air permeable, inner support layer.

25. The antiviral mask of any of items 1-13, further including an air permeable, inner support layer between the polymeric membrane and a face of a wearer of said antiviral mask.

26. The antiviral mask of item 25, wherein the fluorescent virus tagging agent is provided on the air permeable, inner support layer.

27. The antiviral mask of any of items 1-13, wherein the polymeric membrane has a water contact angle of between about 20° and about 115°.

28. The antiviral mask of any of items 1-6, further including a coating of graphene oxide, lignin sulfonate or combinations thereof on the polymeric membrane.

29. The antiviral mask of any of items 1-9, further including a fluorescent virus tagging agent carried on said antiviral mask.

30. An antiviral air filter, comprising: a breathable, microporous polymeric membrane wherein the polymeric membrane has a thickness of between about 30 micron and about 500 micron, a porosity of between about 20% and about 80% and an average pore size of between about 15 nm and about 300 nm.

31. The antiviral air filter of item 30, wherein the polymeric membrane is made from a material selected from a group consisting of polyvinylidene difluoride, polysulfone, poly (methacrylic acid) functionalized polyvinylidene difluoride, poly (methacrylic acid) functionalized polysulfone, poly (methacrylic acid) functionalized polypropylene (PP) and combinations thereof.

32. The antiviral filter of item 30, wherein the polymeric membrane includes a plurality of pores functionalized with a proteolytic enzyme, an antibody and combinations thereof.

33. The antiviral filter of item 32, wherein the proteolytic enzyme is selected from a group consisting of subtilisin, trypsin, papain, proteinase K, chymotrypsin, elastase and combinations thereof.

34. The antiviral filter of item 33, wherein the antibody is selected from a group consisting of a RBD (receptor-binding domain)/ACE2 interaction inhibitor, heparin, glycyrrhizic acid and combinations thereof.

35. The antiviral filter of item 34, further including a coating of graphene oxide, lignin sulfonate or combinations thereof on the polymeric membrane.

36. The antiviral filter of item 35, further including an antiviral agent in the coating.

37. The antiviral filter of item 36, wherein the antiviral agent is selected from a group consisting of a quaternary amine, an essential oil derivative having antiviral properties, copper nanoparticles, gold nanoparticles and combinations thereof.

38. The antiviral filter of item 37, further including a fluorescent virus tagging agent.

39. The antiviral filter of any of items 30-33, further including a coating of graphene oxide, lignin sulfonate or combinations thereof on the polymeric membrane.

40. The antiviral filter of item 39, further including an antiviral agent in the coating.

41. The antiviral filter of item 40, wherein the antiviral agent is selected from a group consisting of a quaternary amine, an essential oil derivative having antiviral properties, copper nanoparticles, gold nanoparticles and combinations thereof.

42. The antiviral filter of item 41, further including a fluorescent virus tagging agent.

43. The antiviral filter of any of items 30-33, further including a fluorescent virus tagging agent.

44. The antiviral filter of any of items 30-38, further including an air permeable outer layer covering the polymeric membrane.

45. The antiviral filter of item 44, further including an air permeable, inner support layer whereby the polymeric membrane is sandwiched between the air permeable outer layer and the air permeable, inner support layer.

46. The antiviral filter of item 45, wherein the virus tagging agent is provided on the air permeable, inner support layer.

47. The antiviral filter of any of items 30-38, further including an air permeable, inner support layer between the polymeric membrane and a face of a wearer of said antiviral mask.

48. The antiviral filter of item 47, wherein the virus tagging agent is provided on the air permeable, inner support layer.

49. The antiviral filter of any of items 30-38, wherein the polymeric membrane has a water contact angle of between about 20° and about 115°.

50. The antiviral filter of any of items 30-33, further including a coating of graphene oxide, lignin sulfonate or a combination thereof on the polymeric membrane.

51. The antiviral filter of any of items 30-36, further including a fluorescent tagging agent.

52. The antiviral filter of any of items 30-36, wherein the polymeric membrane has a pressure drop of less than about 34.47 kPa.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof. Each of the phrases "consisting of" and "consists of", as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic being a system, unit system, sub-unit device, assembly, sub-assembly, mechanism, structure, component or element or, peripheral equipment utility, accessory, or material, step or procedure, sub-step or sub-procedure, but only if each such additional feature or characteristic does not materially alter the basic novel and inventive characteristics or special technical features, of the claimed item.

Terms of approximation, such as the terms about, substantially, approximately, etc., as used herein, refers to ±10% of the stated numerical value.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An antiviral mask, comprising:
   a body having a breathable, microporous polymeric membrane with a thickness of between about 30 microns and about 500 microns; and
   a securing strap connected to the body and adapted to secure the antiviral mask in place over a nose and a mouth of a user wherein (a) the polymeric membrane has a porosity of between about 20% and about 80% and an average pore size of between about 15 nm and about 300 nm, (b) the polymeric membrane is made from a material selected from a group consisting of polyvinylidene difluoride, polysulfone, poly (methacrylic acid) functionalized polyvinylidene difluoride, poly (methacrylic acid) functionalized polysulfone, poly (methacrylic acid functionalized polypropylene (PP) and combinations thereof, (c) the polymeric membrane includes a plurality of pores functionalized with a proteolytic enzyme, an antibody or combinations thereof, and (d) the proteolytic enzyme is selected from a group consisting of subtilisin, trypsin, papain, proteinase K, chymotrypsin, elastase and combinations thereof.

2. The antiviral mask of claim 1, wherein the polymeric membrane has a pressure drop of less than about 34.47 kPa.

3. The antiviral mask of claim 1, wherein the polymeric membrane has a water contact angle of between about 20° and about 115°.

4. The antiviral mask of claim 1, further including a coating of graphene oxide, lignin sulfonate or combinations thereof on the polymeric membrane.

5. The antiviral mask of any of claim 1, further including a fluorescent virus tagging agent carried on said antiviral mask.

6. The antiviral mask of claim 1, wherein the antibody is selected from a group consisting of a RBD (receptor-binding domain)/ACE2 interaction inhibitor, heparin, glycyrrhizic acid and combinations thereof.

7. The antiviral mask of claim 1, further including a coating of graphene oxide, lignin sulfonate or combinations thereof on the polymeric membrane.

8. The antiviral mask of claim 7, further including an antiviral agent in the coating.

9. The antiviral mask of claim 8, wherein the antiviral agent is selected from a group consisting of a quaternary amine, an essential oil derivative having antiviral properties, copper nanoparticles, gold nanoparticles and combinations thereof.

10. The antiviral mask of claim 7, further including a fluorescent virus tagging agent.

11. The antiviral mask of claim 10, further including an air permeable, inner support layer configured to be arranged between the polymeric membrane and a face of the user of said antiviral mask.

12. The antiviral mask of claim 11, wherein the fluorescent virus tagging agent is provided on the air permeable, inner support layer.

* * * * *